(12) United States Patent
Filippi et al.

(10) Patent No.: US 10,585,560 B2
(45) Date of Patent: Mar. 10, 2020

(54) DISPLAY MANAGEMENT FOR DATA VISUALIZATIONS OF ANALYTICS DATA

(71) Applicant: SPLUNK INC., San Francisco, CA (US)

(72) Inventors: Nicholas Filippi, San Francisco, CA (US); Siegfried Puchbauer-Schnabel, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 212 days.

(21) Appl. No.: 15/339,849

(22) Filed: Oct. 31, 2016

(65) Prior Publication Data
US 2018/0121035 A1 May 3, 2018

(51) Int. Cl.
*G06F 11/30* (2006.01)
*G06F 3/0482* (2013.01)
*G06F 17/22* (2006.01)
*G06T 11/20* (2006.01)

(52) U.S. Cl.
CPC ........ *G06F 3/0482* (2013.01); *G06F 11/3089* (2013.01); *G06F 17/2247* (2013.01); *G06T 11/206* (2013.01)

(58) Field of Classification Search
CPC .. G06F 3/0482; G06F 17/2247; G06F 11/206; G06F 17/3089; G06F 11/3409; G06F 17/30554; G06F 9/542; G06F 11/328; G06F 17/30551; G06F 17/30572; G06F 2201/86
See application file for complete search history.

(56) References Cited

U.S. PATENT DOCUMENTS

| 5,023,908 | A | * | 6/1991 | Weiss | G06F 7/582 235/379 |
| 9,210,056 | B1 | * | 12/2015 | Choudhary | G06F 17/30864 |
| 2003/0167315 | A1 | * | 9/2003 | Chowdhry | G06F 17/30873 709/218 |
| 2005/0216300 | A1 | * | 9/2005 | Appelman | G06Q 10/10 705/319 |
| 2010/0017380 | A1 | * | 1/2010 | Naibo | G06F 17/30398 707/E17.136 |
| 2010/0174749 | A1 | * | 7/2010 | Saxena | G06F 17/30306 707/781 |
| 2011/0001686 | A1 | * | 1/2011 | Belvin | G06F 3/1454 345/2.2 |

(Continued)

OTHER PUBLICATIONS

"The 17 Best Apps for Finance", published: Aug. 13, 2012, publisher: Business Insider, pp. 1-9 (Year: 2012).*

*Primary Examiner* — Wilson W Tsui
(74) *Attorney, Agent, or Firm* — Shook, Hardy & Bacon L.L.P.

(57) ABSTRACT

In various implementations, a display of a display device is registered based on receiving a request from the display device. User input is received from a display management device indicating a display configuration setting for the display. User input is received indicating an assignment of a data visualization of analytics data to the registered display based on the display configuration setting. In response to the receiving of the user input indicating the assignment, data is sent that causes the data visualization to be presented on the registered display.

30 Claims, 32 Drawing Sheets

(56) References Cited

U.S. PATENT DOCUMENTS

| | | | |
|---|---|---|---|
| 2012/0023429 A1* | 1/2012 | Medhi | G06F 11/323 |
| | | | 715/772 |
| 2014/0032639 A1* | 1/2014 | Trousdell | A63F 13/65 |
| | | | 709/203 |
| 2014/0075354 A1* | 3/2014 | Ko | G06F 3/04883 |
| | | | 715/769 |
| 2014/0259135 A1* | 9/2014 | Postrel | H04L 63/0807 |
| | | | 726/7 |
| 2015/0212663 A1* | 7/2015 | Papale | G06F 17/30424 |
| | | | 715/762 |
| 2015/0295775 A1* | 10/2015 | Dickey | H04L 41/22 |
| | | | 715/735 |
| 2017/0293673 A1* | 10/2017 | Purumala | G06F 17/30601 |

\* cited by examiner

| Data Summary | | | |
|---|---|---|---|
| Hosts (5) | Sources (8) | Sourcetypes (3) | | filter

| Host ◊ | | Count ◊ | Last Update ◊ |
|---|---|---|---|
| mailsv | ⊪ ∨ | 9,829 | 4/29/14 1:32:47.000 PM |
| vendor_sales | ⊪ ∨ | 30,244 | 4/29/14 1:32:46.000 PM |
| www1 | ⊪ ∨ | 24,221 | 4/29/14 1:32:44.000 PM |
| www2 | ⊪ ∨ | 22,595 | 4/29/14 1:32:47.000 PM |
| www3 | ⊪ ∨ | 22,975 | 4/29/14 1:32:45.000 PM |

FIG. 6B

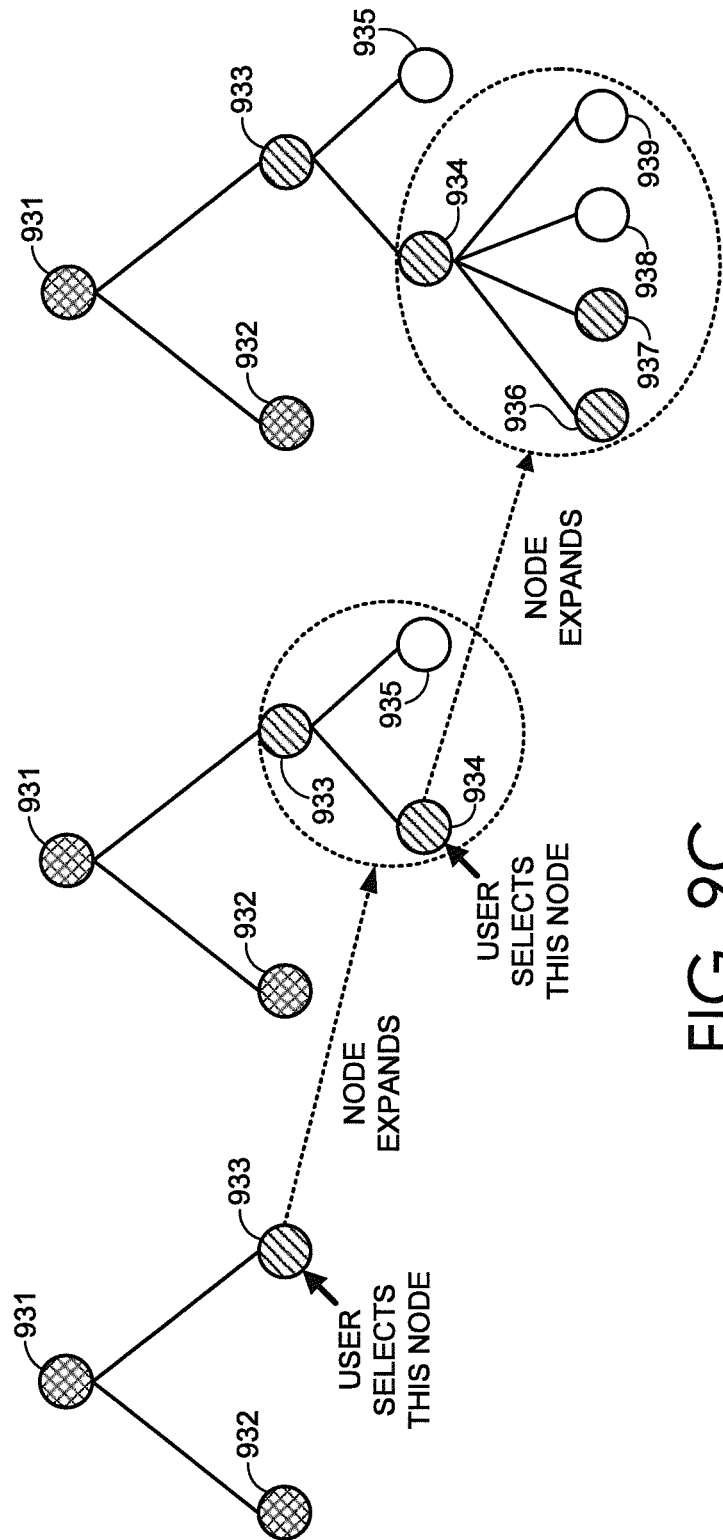

New Pivot 1,966 events (before 9/22/13 5:19:02.000 PM)

Filters

All time | Highest 10 produ. | Highest 10 product name by price

Split Rows product name | price

Split Columns

+

Column Values

Count of Success. | Sum of price

Save As... ▼ | Clear

Complete | 2010 | Successful_purchases ▼

Documentation

| product name ↕ | price ↕ | Count of Successful purchases ↕ | Sum of price ▼ |
|---|---|---|---|
| Dream Crusher | 39.99 | 227 | 9077.73 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

DISPLAY MANAGEMENT FOR DATA VISUALIZATIONS OF ANALYTICS DATA

BACKGROUND

Data visualizations present information to users in a structured and organized manner, allowing the users to quickly and easily view and interpret underlying data. In some cases, data visualizations may be displayed on one or more monitors, such as TV monitors or wall-mounted displays (e.g., in an operations center). This allows many users to simultaneously view and track the underlying data. Despite being accessible to users, the users may be actively engaged in other tasks, which divert their attention from the data visualizations. Thus, anomalies in the underlying data may go unnoticed for extended periods of time. These delays in identifying and reacting to notable information in underlying data can compromise both the performance and security of computing systems.

Further, groups of users may be interested in viewing the same data visualization concurrently. Problems may arise where the users are viewing different data visualizations that could be superficially similar (e.g., they may use a common template, but be based on a different underlying data set), or are out of sync. In order to view the same data visualization, each user must separately enable the specific visualization, with the same specific configurations and settings, which may need to be manually configured by each user. A difference in any of these parameters can produce inconsistent displays, which may not be readily apparent to users.

SUMMARY

Embodiments of the present invention are directed to display management for data visualizations of analytics data. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 6B illustrates a data summary dialog that enables a user to select various data sources in accordance with the disclosed embodiments;

FIG. 9C illustrates a proactive monitoring tree in accordance with the disclosed embodiments;

FIGS. 12-14 illustrate a series of user interface screens for an example data model-driven report generation interface in accordance with the disclosed embodiments;

FIG. 21A illustrates an example of an alert configuration screen in accordance with the disclosed embodiments;

FIG. 21B illustrates an example of an alert configuration screen in accordance with the disclosed embodiments;

DETAILED DESCRIPTION

Figure 1:
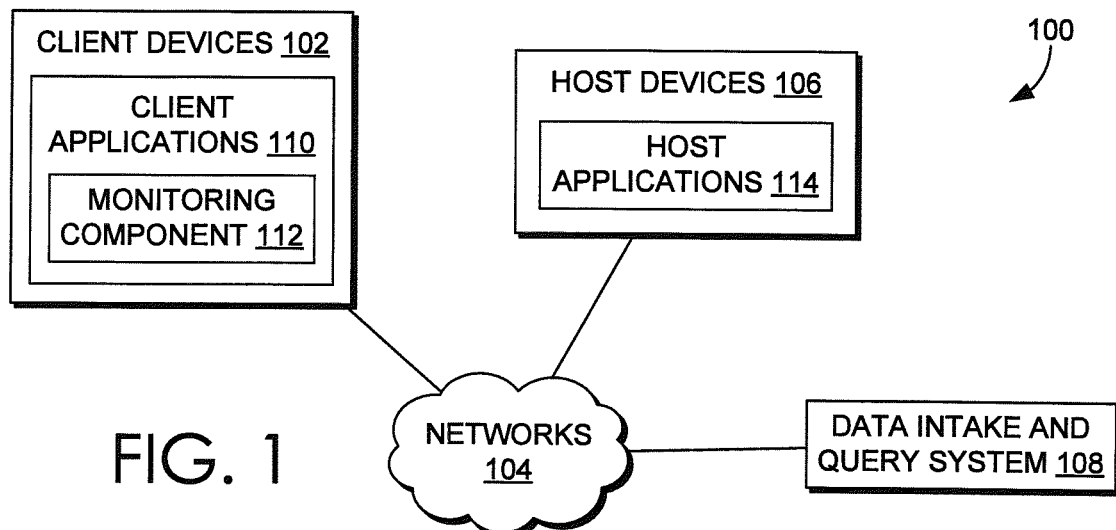
FIG. 1 illustrates a networked computer environment in which an embodiment may be implemented.

Embodiments are described herein according to the following outline:

1.0. General Overview
  2.0. Operating Environment
    2.1. Host Devices
    2.2. Client Devices
    2.3. Client Device Applications
    2.4. Data Server System
    2.5. Data Ingestion 2.5.1. Input
2.5.2. Parsing
2.5.3. Indexing
2.6. Query Processing
2.7. Field Extraction
2.8. Example Search Screen
2.9. Data Modelling
2.10. Acceleration Techniques
   2.10.1. Aggregation Technique
   2.10.2. Keyword Index
   2.10.3. High Performance Analytics Store
   2.10.4. Accelerating Report Generation
2.11. Security Features
2.12. Data Center Monitoring
2.13. Cloud-Based System Overview
2.14. Searching Externally Archived Data
   2.14.1. ERP Process Features
3.0. Display Management
3.1. Display Management System
3.2. Display Registration
3.3. Providing Content to Displays
3.4 Display Management Screen
3.5 Additional Examples of Display Content Assignment
3.6 Content Triggering and Scheduling
3.7 Content Prioritization and Display Alerts
3.8 Additional Implementations
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
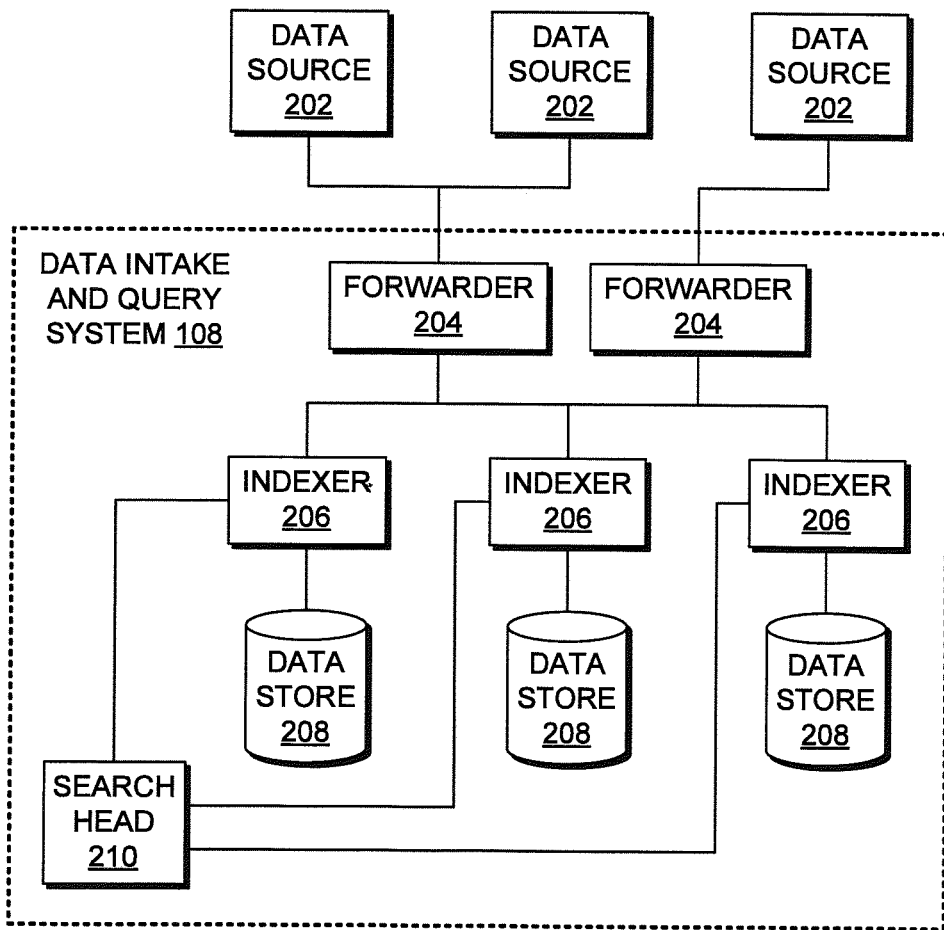
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
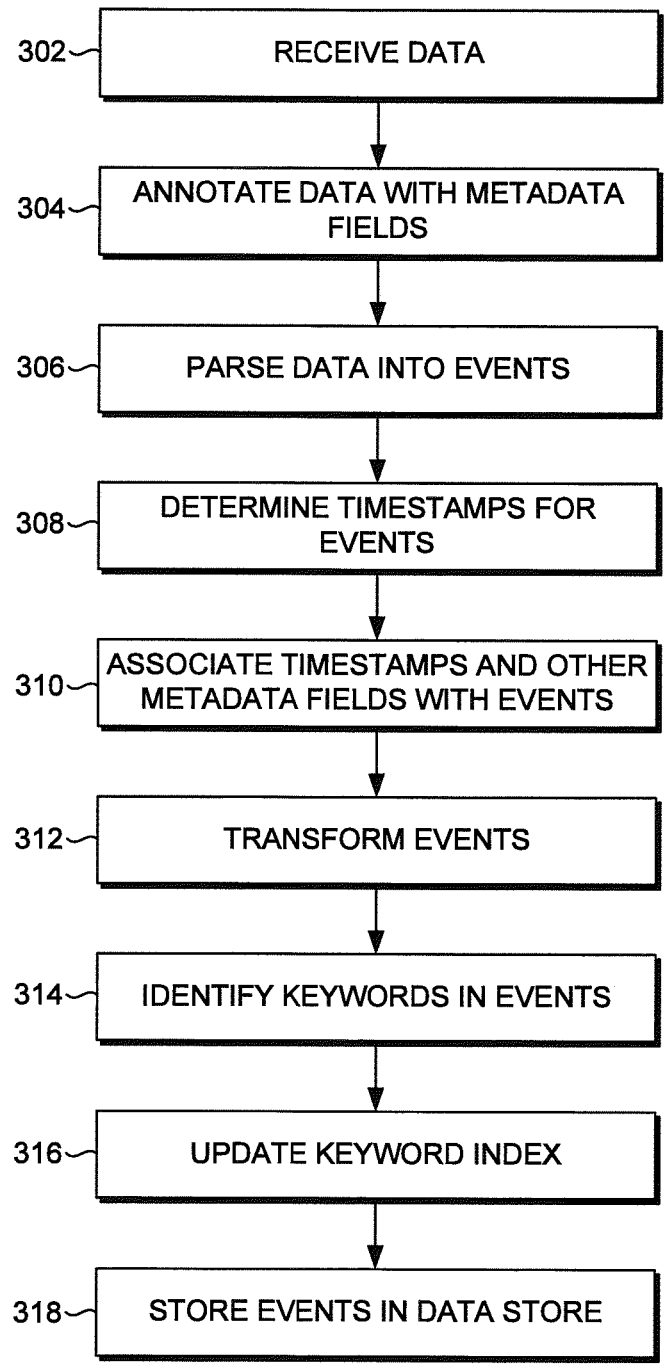
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
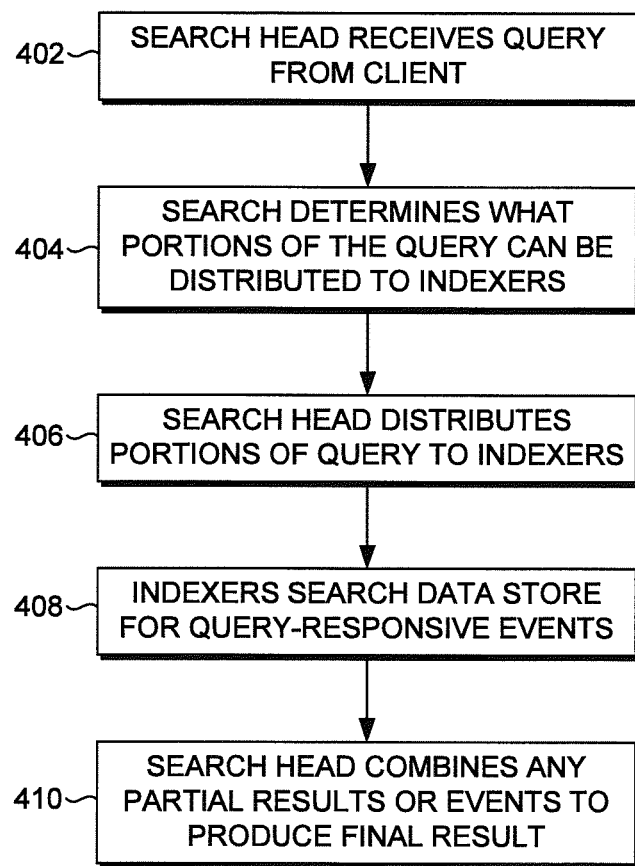
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
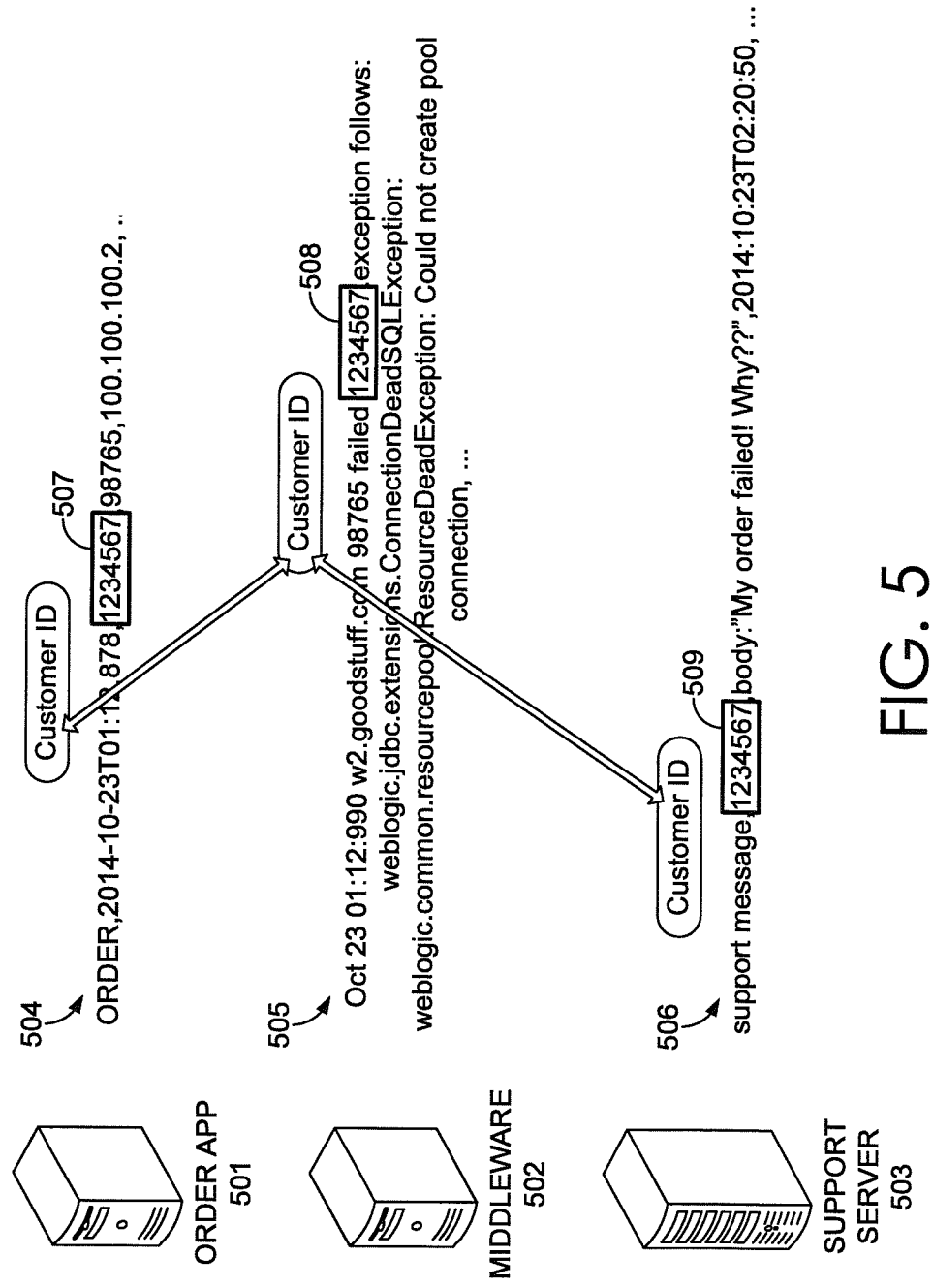
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
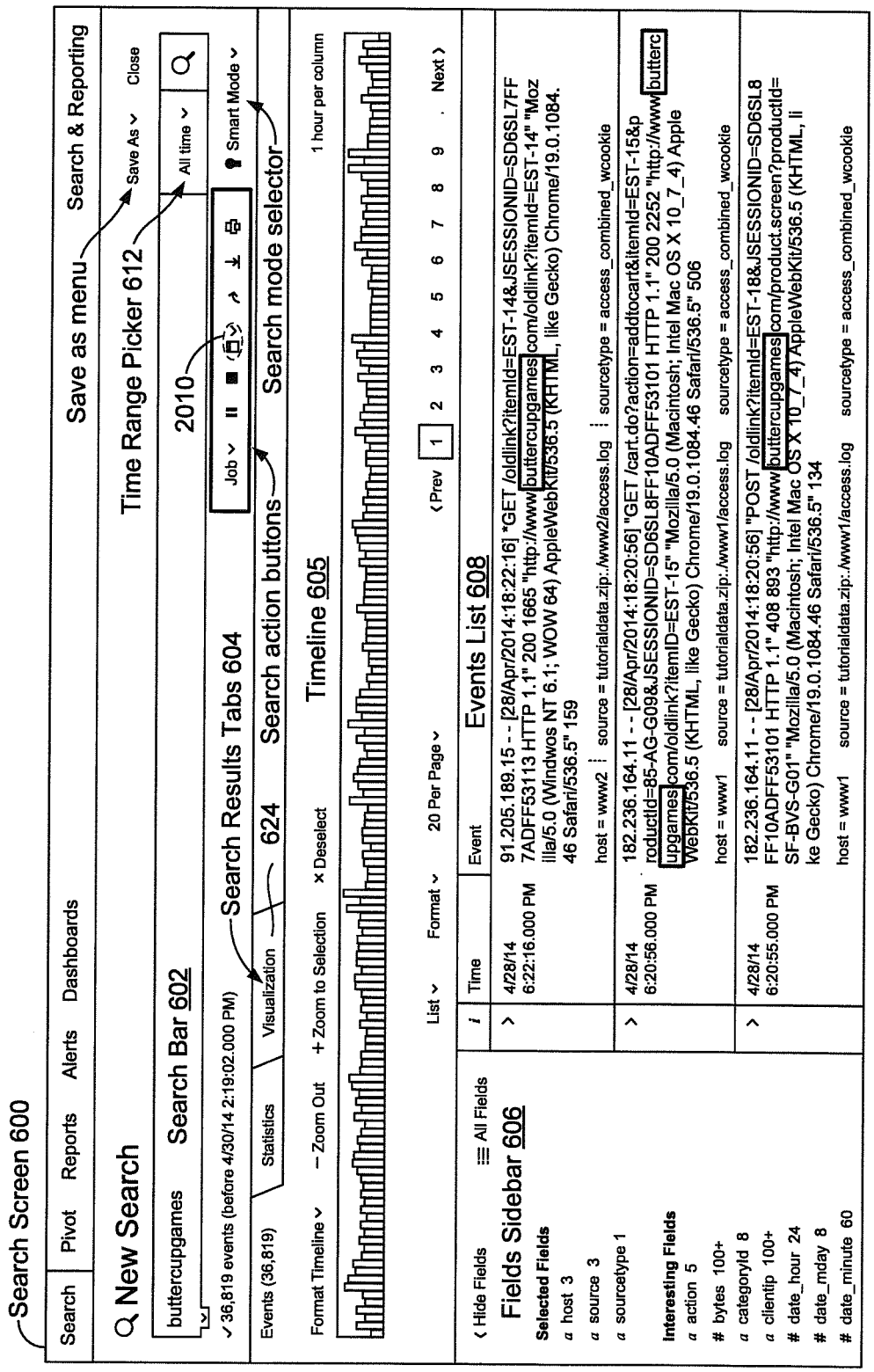
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
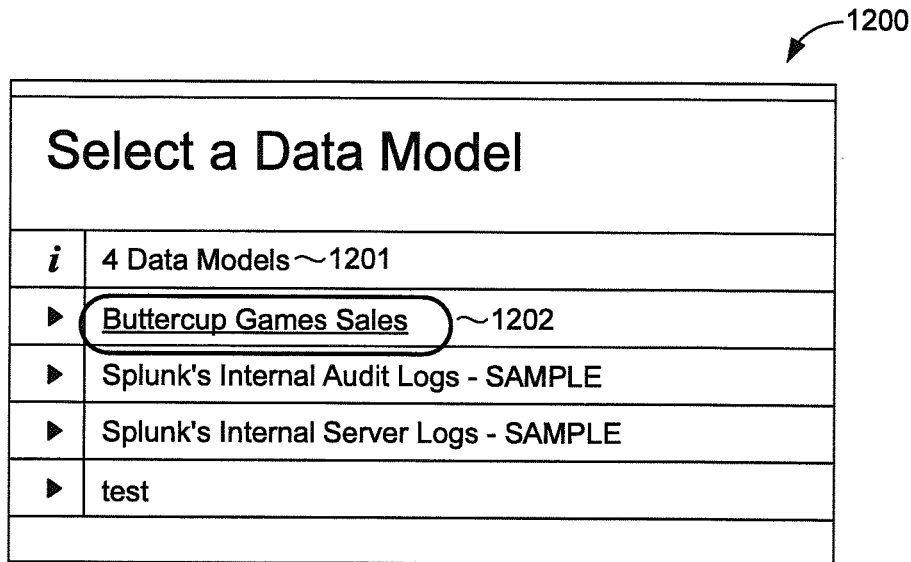

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
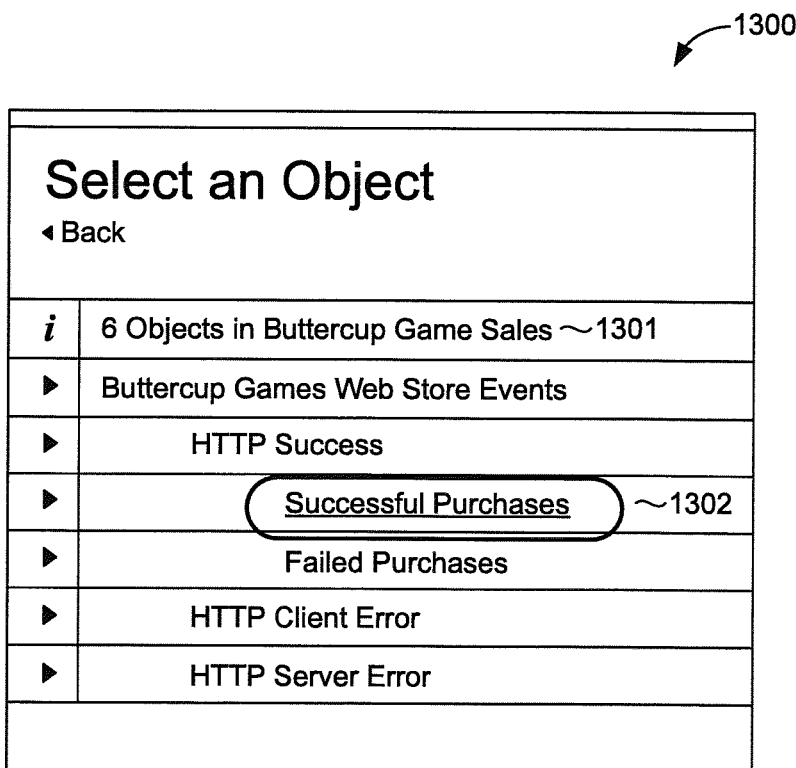

FIG. 13 illustrates an example data model object selection graphical user interface 1300 that displays available data objects 1301 for the selected data object model 1202. The user may select one of the displayed data model objects 1302 for use in driving the report generation process.

Figure 7A:
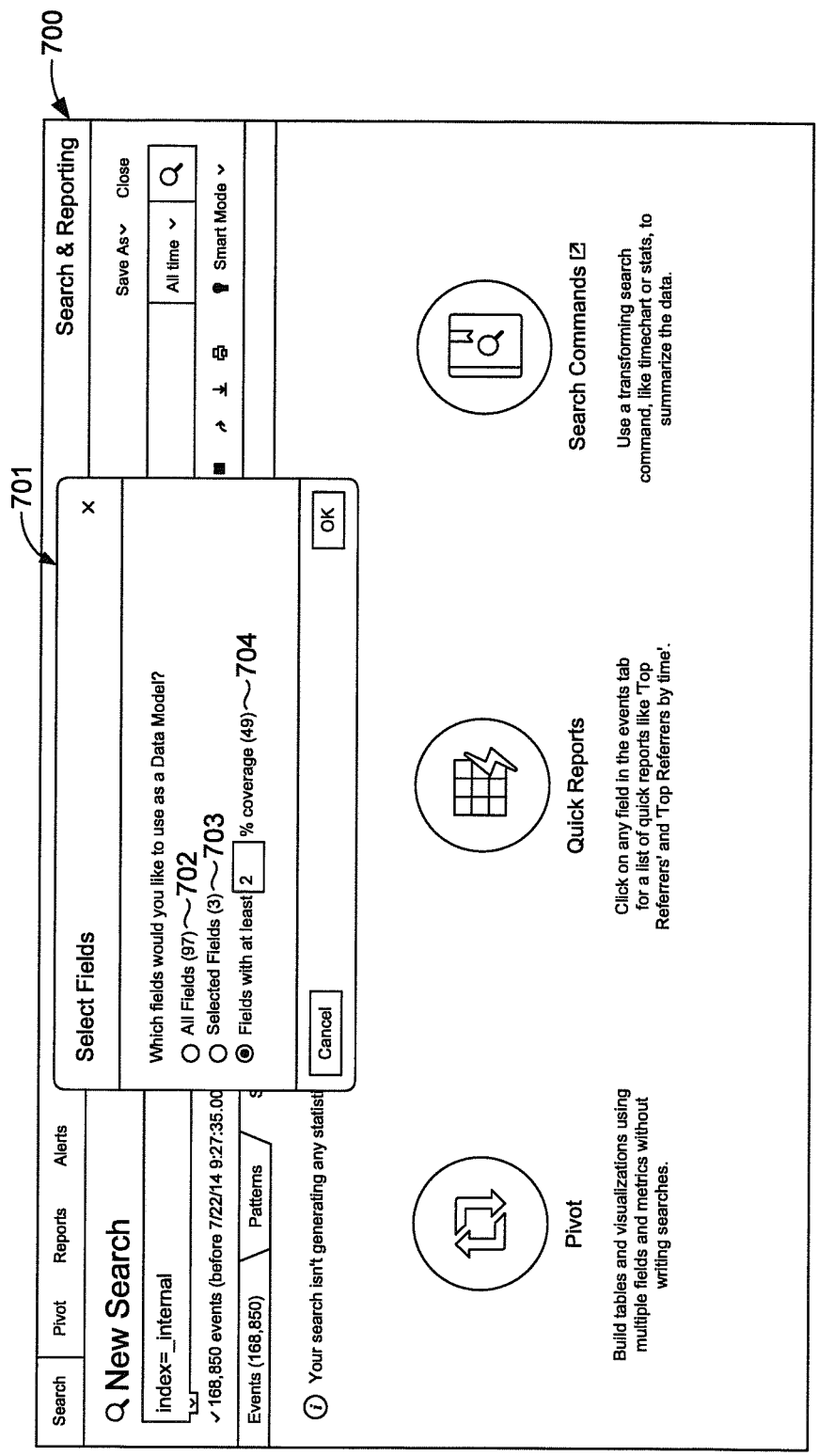
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
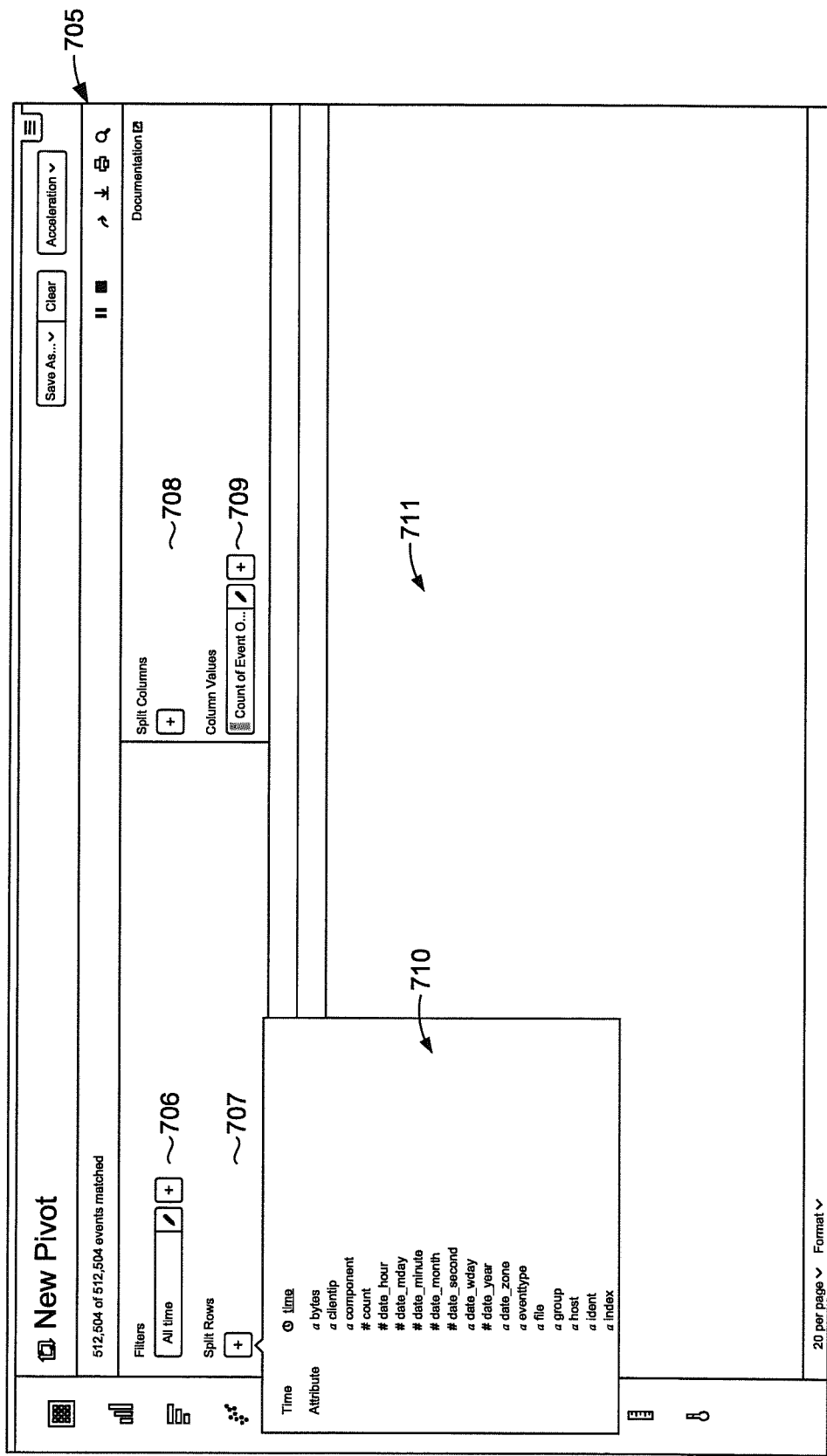
Figure 7C:
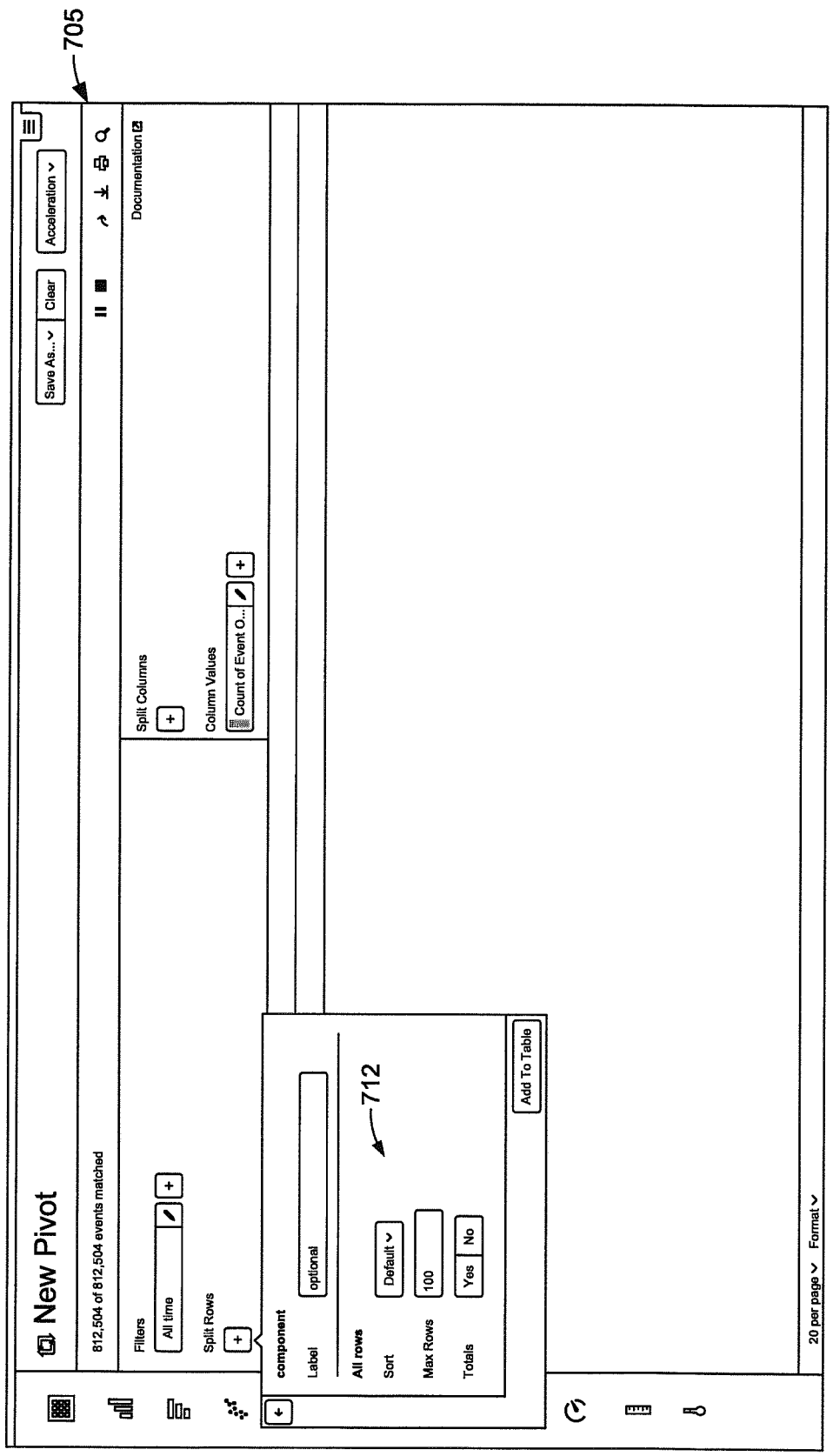

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
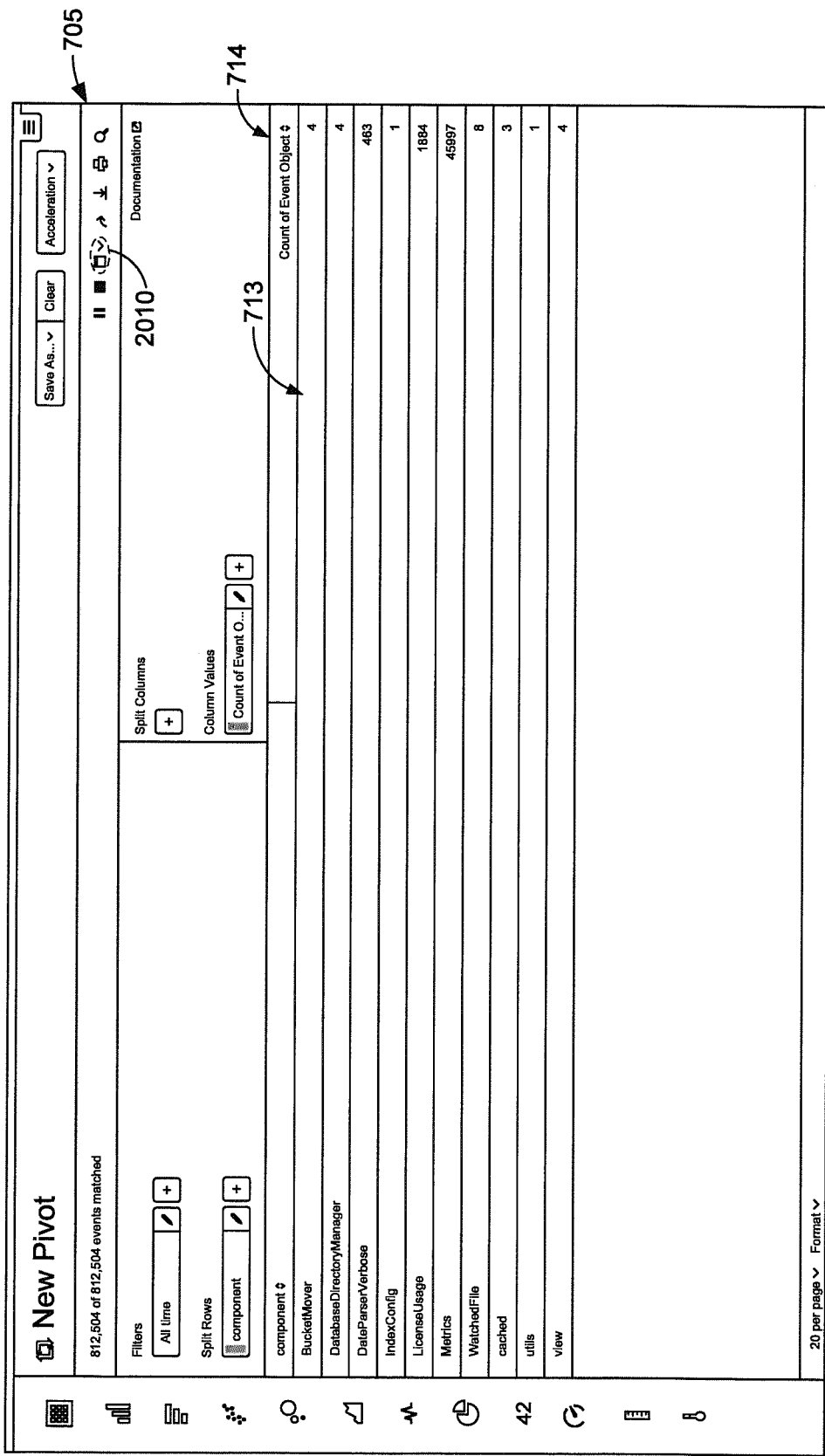

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
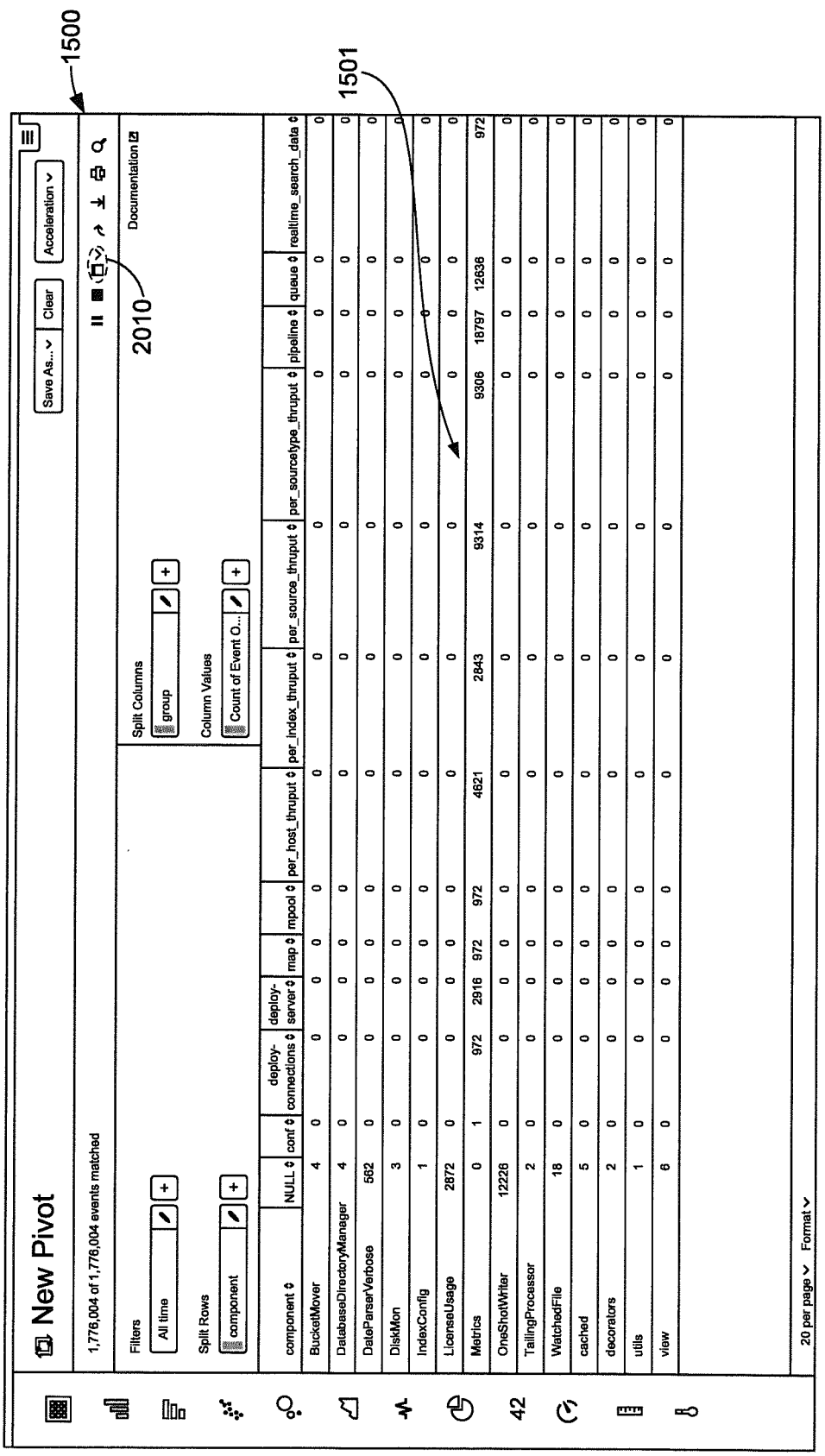
FIGS. 15-17 illustrate example visualizations generated by a reporting application in accordance with the disclosed embodiments.
Figure 16:
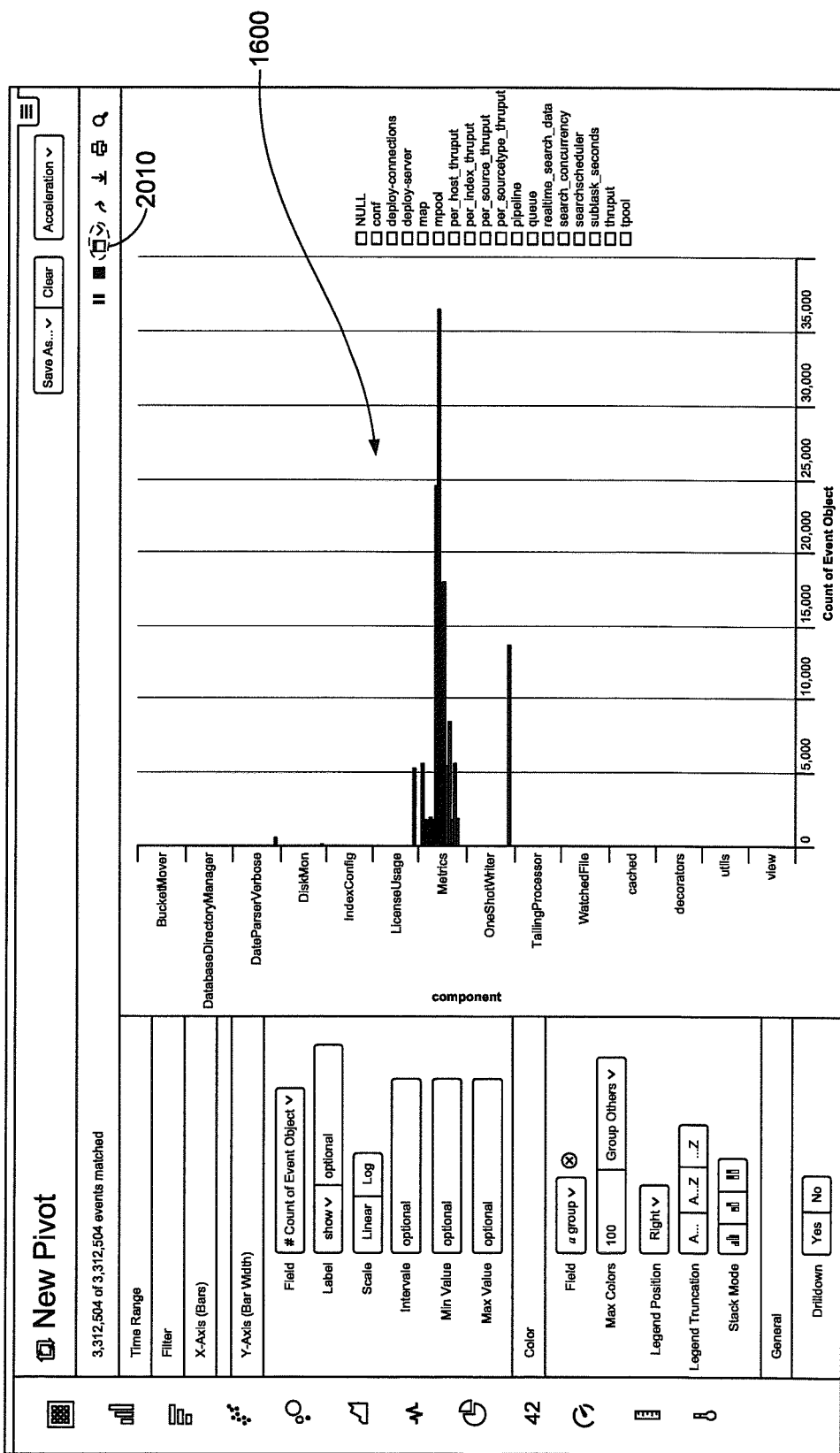
Figure 17:
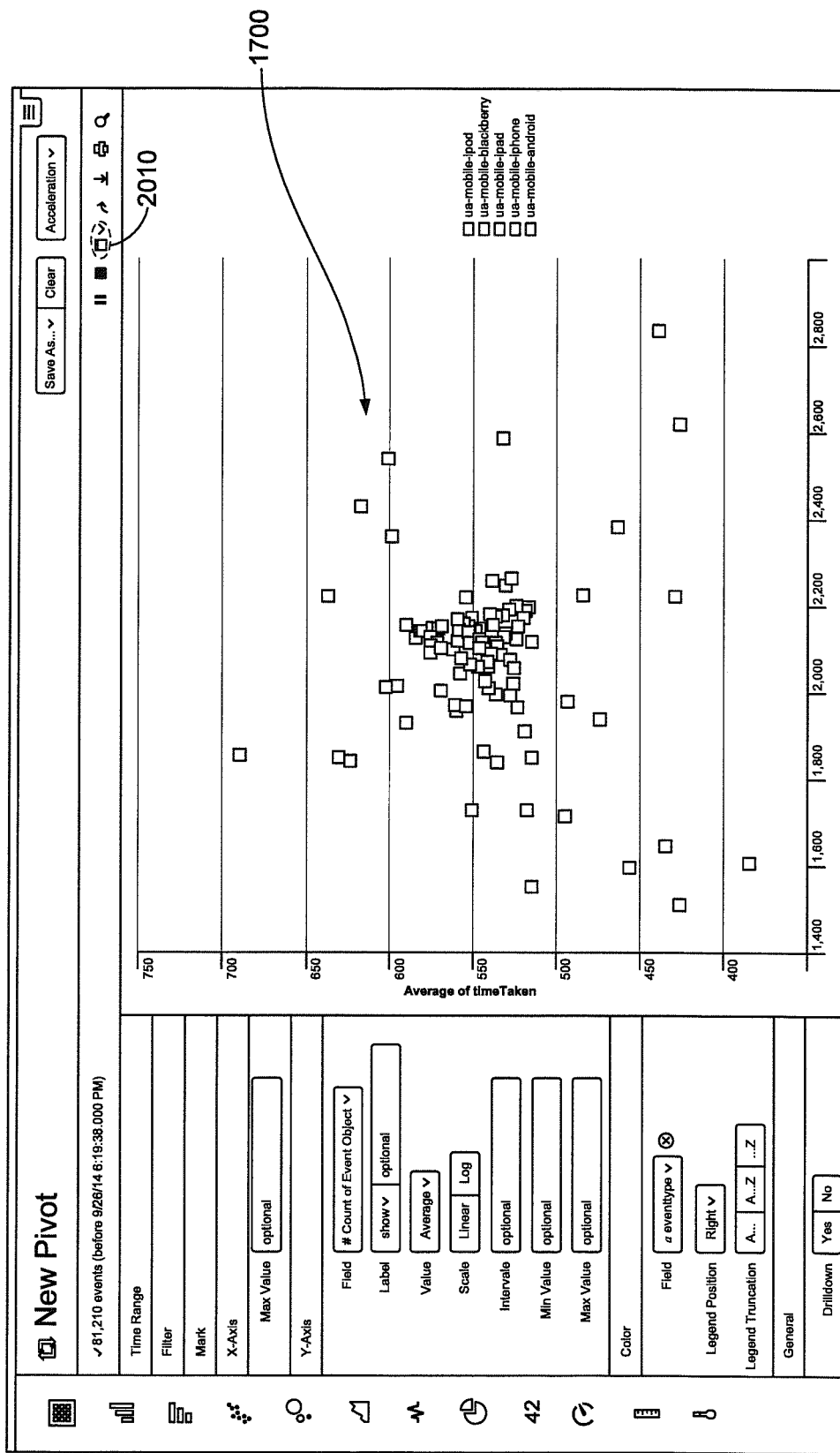

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
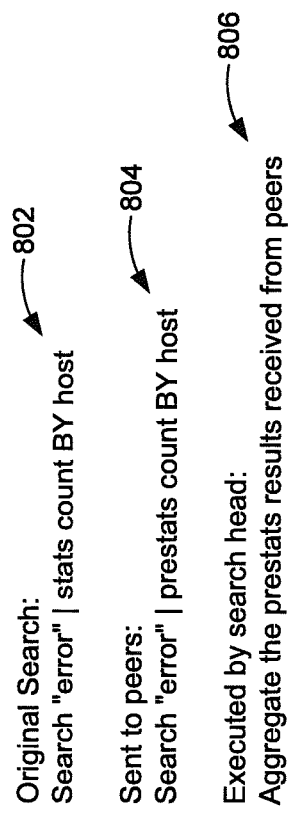
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
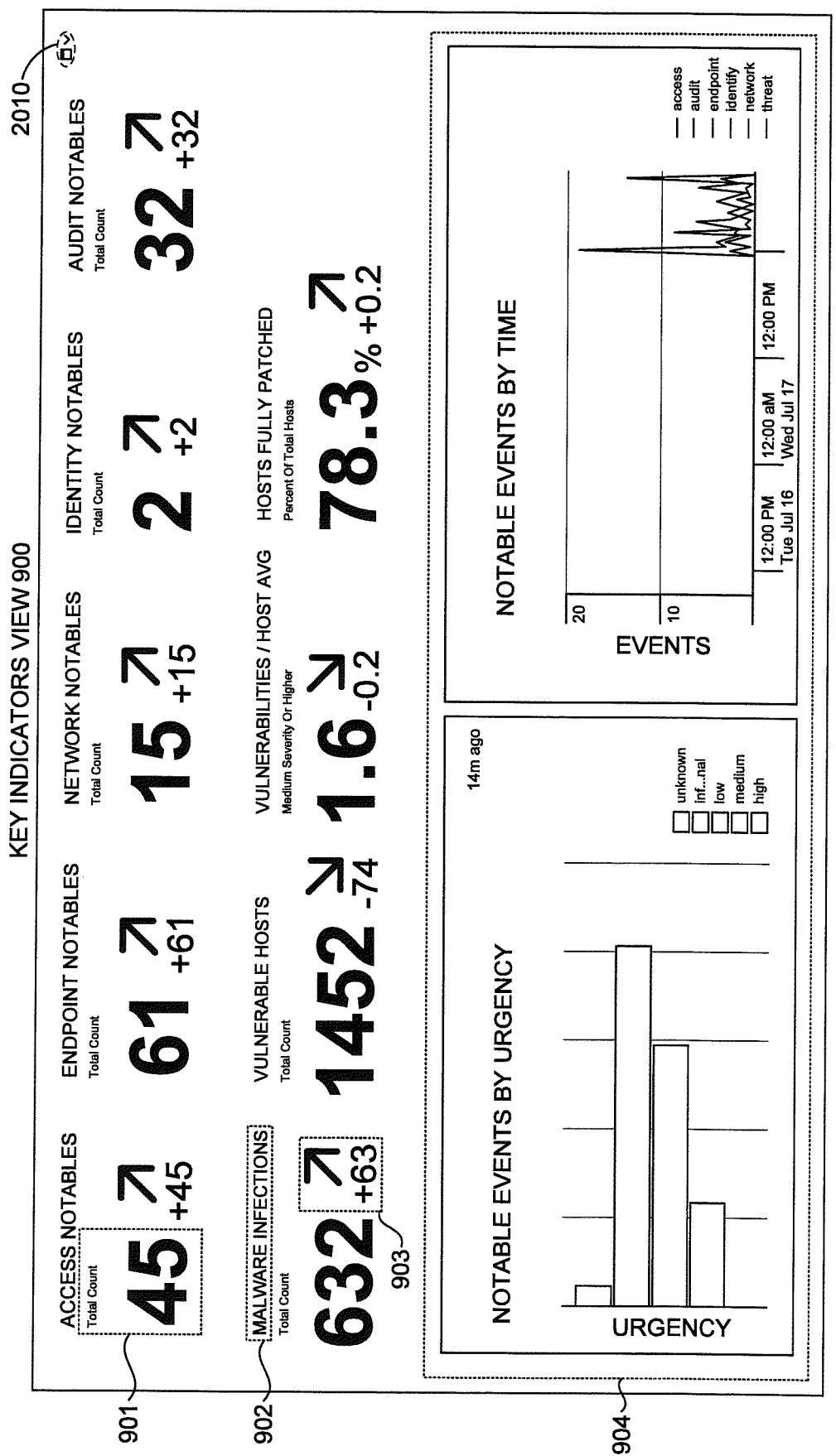
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
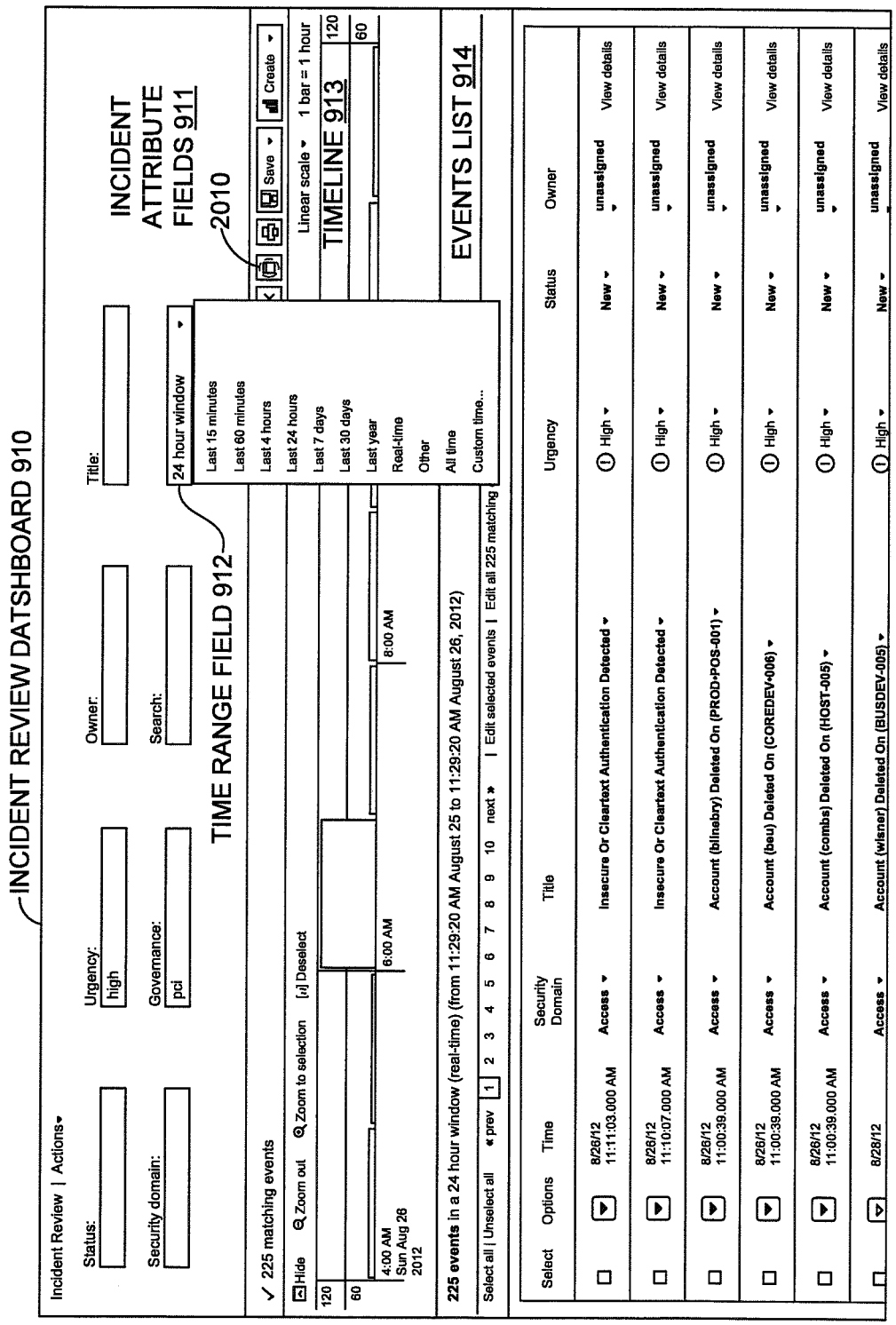
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
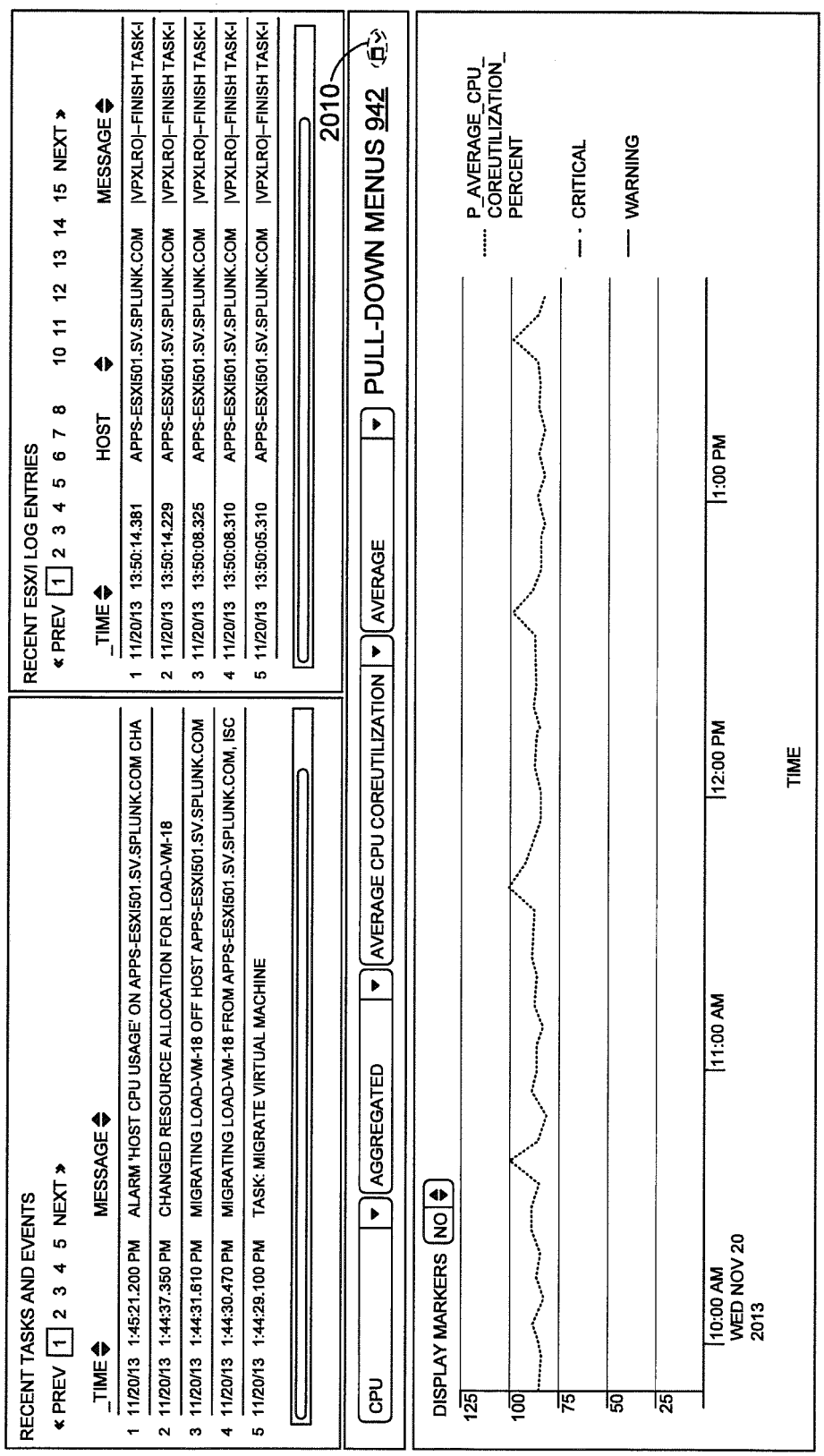
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
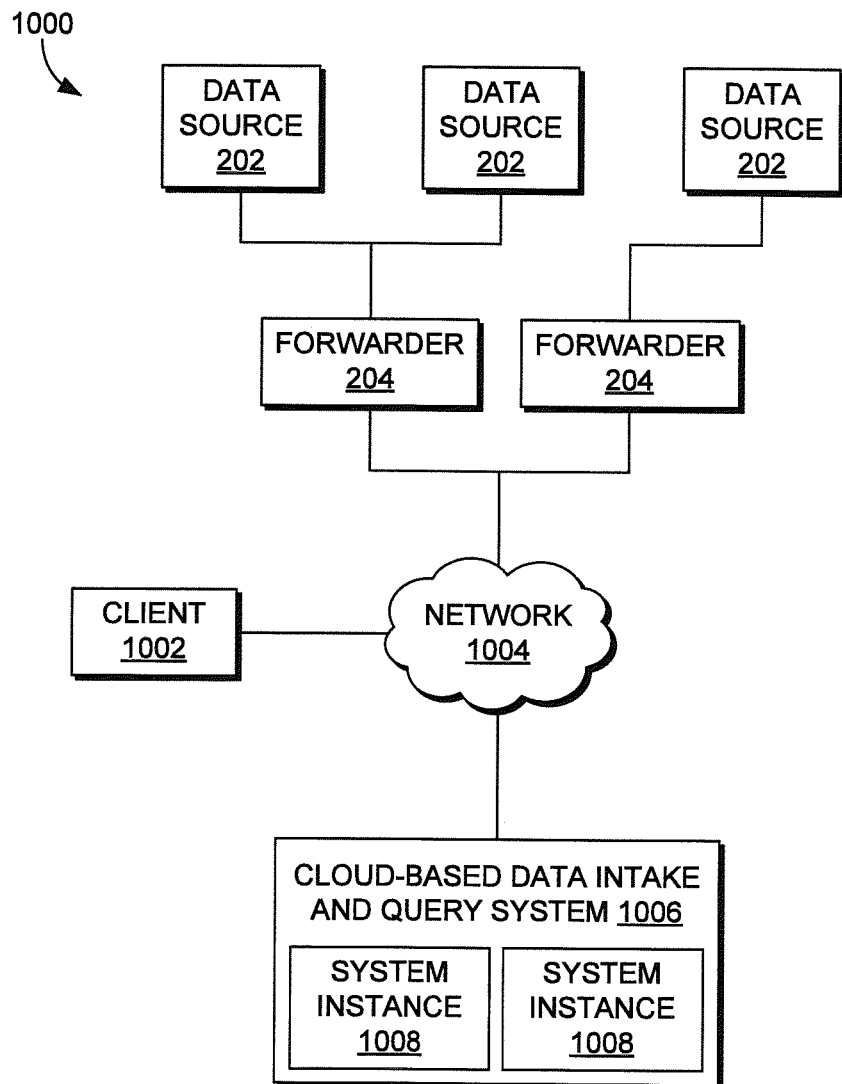
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
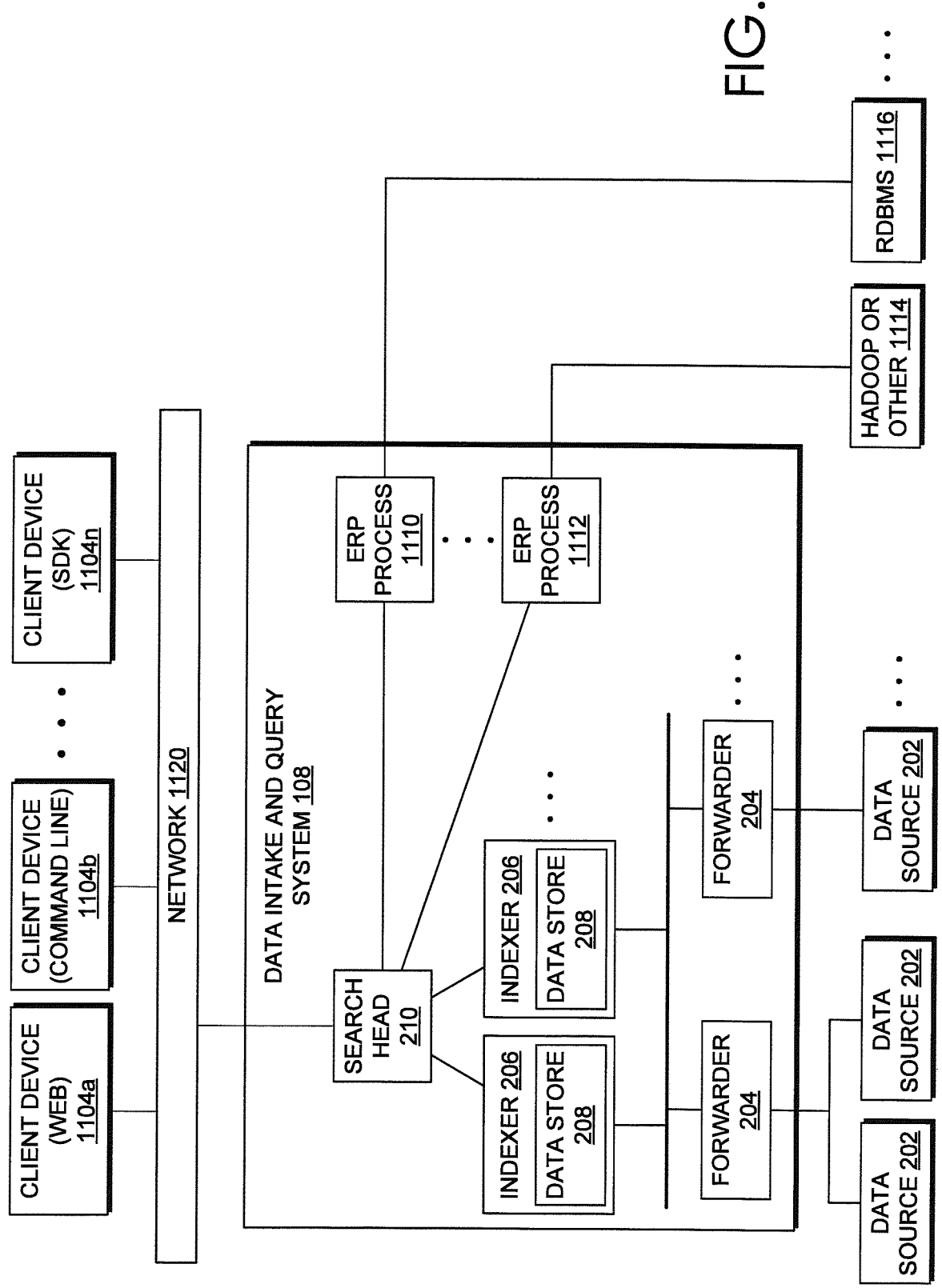
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112. FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example of a query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 Display Management

Data visualizations present information to users in a structured and organized manner, allowing the users to quickly and easily view and interpret underlying data. Examples of data visualizations have been described above, and include dashboards, pivots, reports, charts, graphs, tables, animations, diagrams, models, and the like, which are generated from underlying data, such as analytics data. As described above, at least some of this underlying data can correspond to machine-generated data, portions of which may be associated with respective events. Using machine-generated data, the data visualizations can provide forensic data visualizations so that users can investigate data from digital devices, such as servers, sensors, routers, mobile devices, Internet of Things (IoT) devices, and the like.

Data visualizations can be particularly useful for monitoring or investigating service performance, such as for IT service monitoring, and identifying both known and unknown security threats, from the underlying data. Examples of such visualizations have been described above with respect to FIGS. 6A, 7D, 9A, 9B, 9D, 14, 15, 16, and 17. Various data visualizations may be commonly used in operations centers, such as NOCs, or information security operations centers (ISOCs). In some cases, data visualizations may be displayed on one or more monitors, such as TV monitors or wall-mounted displays (e.g., in an operations center). This allows many users to simultaneously view and track the underlying data.

Despite being accessible to users, such as on TV monitors, the users may be actively engaged in other tasks, which divert their attention from the data visualizations. Thus, anomalies in the underlying data may go unnoticed for extended periods of time. Also, when a user does become aware of an issue, they may need to bring the issue to the attention of one or more other users, such as those with the ability to take appropriate action. Some of these issues may be remedied using alerts, which are automatically generated to notify users, such as system operators, when important or notable events are discovered. However, these alerts also may go unnoticed for a time in emails, messages, and the like. These delays in identifying and reacting to notable information in underlying data can compromise both the performance and security of computing systems.

Groups of users may be interested in viewing the same data visualization concurrently. As an example, these users could be part of the same operations group or team, but may be geographically dispersed across offices, buildings, cities, countries, and continents. This could occur when one user identifies an interesting aspect of a data visualization or otherwise would like to discuss a data visualization. In response, the user may call another user who may or may not have access to the relevant data visualization. Problems may arise where the users are viewing different data visualizations that could be superficially similar (e.g., they may use a common template, but be based on a different underlying data set), or are out of sync. In order to view the same data visualization, each user must separately enable the specific visualization, with the same specific configurations and settings, which may need to be manually configured by each user. A difference in any of these parameters can produce inconsistent displays, which may not be readily apparent to the user. For example, in dynamic data visualizations, the visualizations may initially appear similar and diverge. As another example, different underlying data sets could include similarly labeled fields that are exposed to the users, causing confusion.

Various implementations are described in the present disclosure, some of which may be utilized to mitigate the aforementioned problems. In some respects, displays (e.g., of display devices) are registered with a display management system. The display management system can be used to associate particular registered displays with particular data visualizations. This can be accomplished, for example, from a user interface, allowing centralized control and management of multiple displays, which may be located in different geographic regions, and may be attached to and hosted by different computing devices.

In some implementations, the user interface can include functionality or control elements with which to form groups of registered displays based on user input. Using groups, various implementations can or can be used to associate particular registered displays with particular data visualizations at the group level, by assigning one or more data visualizations to a group of registered displays. For example, the user may assign a particular display to one or more display groups. The display group or groups to which a display belongs can be stored in association with the display, such as in metadata. In addition to or instead of direct group assignment of displays by a user, displays may be assigned to groups based on display tags and/or display properties. For example a user may assign any of various tags and/or display properties to the displays and the user or the display management system can define groups using these tags. In some cases, one or more of the display properties are determined based on the display, such as based on being reported by or detected from the display and/or the computing device or devices hosting the display (e.g., during device registration).

Associating, or assigning, a display with a set of data visualizations (a set as used herein contains at least one item and does not require the display management system to be capable of accommodating multiple items) can cause the set of data visualizations to be presented on the display. As will later be described in additional detail, in some approaches, the display management system causes this presentation by pushing one or more data visualizations in the set of data visualizations to a display or group of displays.

In some cases, each data visualization in the set of data visualizations may be presented concurrently on a particular display. In other cases, a subset of the data visualizations may be presented concurrently (e.g., a single data visualization or multiple). In either of these cases, a schedule (e.g., time based) or other trigger condition may be used to determine when a particular data visualization is presented on the display. In various implementations, the user interface allows the user to set the schedule and/or other trigger conditions for the data visualizations. Each display or group of displays may have a corresponding set of schedules and/or other trigger conditions defined by the user using the user interface and/or by the display management system.

In some cases, a single display or groups of displays may be assigned multiple sets of data visualizations. Each set of data visualizations may have a different set of associated trigger conditions. Display prioritization can be used to determine which set of data visualizations to cause to be presented on a display. For example, different sets and/or trigger conditions may have different priority levels or criteria (e.g., assigned by or determined by the user or display management system) the display management system can use to determine which data visualization should be presented, even where trigger conditions across multiple sets are satisfied. This can be used, for example, to display the most important data visualizations, such as where the trigger condition relates to a security breach, a system failure, or other notable event.

Rather than the display management system waiting for or determining one or more trigger conditions are satisfied, assigning a set of data visualizations to a display may cause the display management system to immediately send the set of data visualizations to the display and cause the display to present the set of data visualizations. For example, a user may select to display the set on a particular display or group of displays, causing an immediate update to corresponding displays.

In some implementations, a set of trigger conditions may be associated with an alert, in addition to or instead of a set of data visualizations. In response to the set of trigger conditions being satisfied (i.e., the alert being triggered), a set of actions may be taken for the alert. An action represents a predefined response to the set of trigger conditions being satisfied. In various implementations, at least one action of an alert can cause an update to a set of displays associated with the alert. For example, the update can be pushed to or otherwise be immediately sent to each corresponding display upon the alert being triggered, causing the display to be updated.

An update for a display can comprise content for the display. In some implementations, the content comprises a set of data visualizations to replace or add to one or more currently displayed data visualizations. In addition or instead, an update can modify content of one or more currently displayed data visualizations, such as by changing colors, text formatting, or other display attributes of a data visualization. In addition or instead the update can include additional content to present on the display in addition to or instead of data visualizations, such as one or more images, videos, audio, banners, animations, high contrast colors, and the like. Visual content may be embedded within one or more presented data visualizations, displayed over one or more of the data visualizations (e.g., overlie), and/or displayed alongside one or more of the data visualizations.

Each alert may comprise, for example, one or more trigger conditions, an alert type, one or more actions, and/or other alert parameters. One or more of these parameters may be assigned to an alert by the user in the user interface and/or the display management system. For example, via the user interface, a user may set up various alerts for corresponding displayed and/or display groups. When an alert is triggered, each display associated with the alert can be updated, such that users across different geographies are instantaneously notified in a noticeable fashion, allowing them to take immediate action. Examples of alerts include a high contrast notice superimposed over a data visualization, a flash banner notice, a scrolling warning on the display, a change to a color on the display, an audible tone or alarm, an accouchement, a flashing message, and more.

3.1 Display Management System

Figure 18:
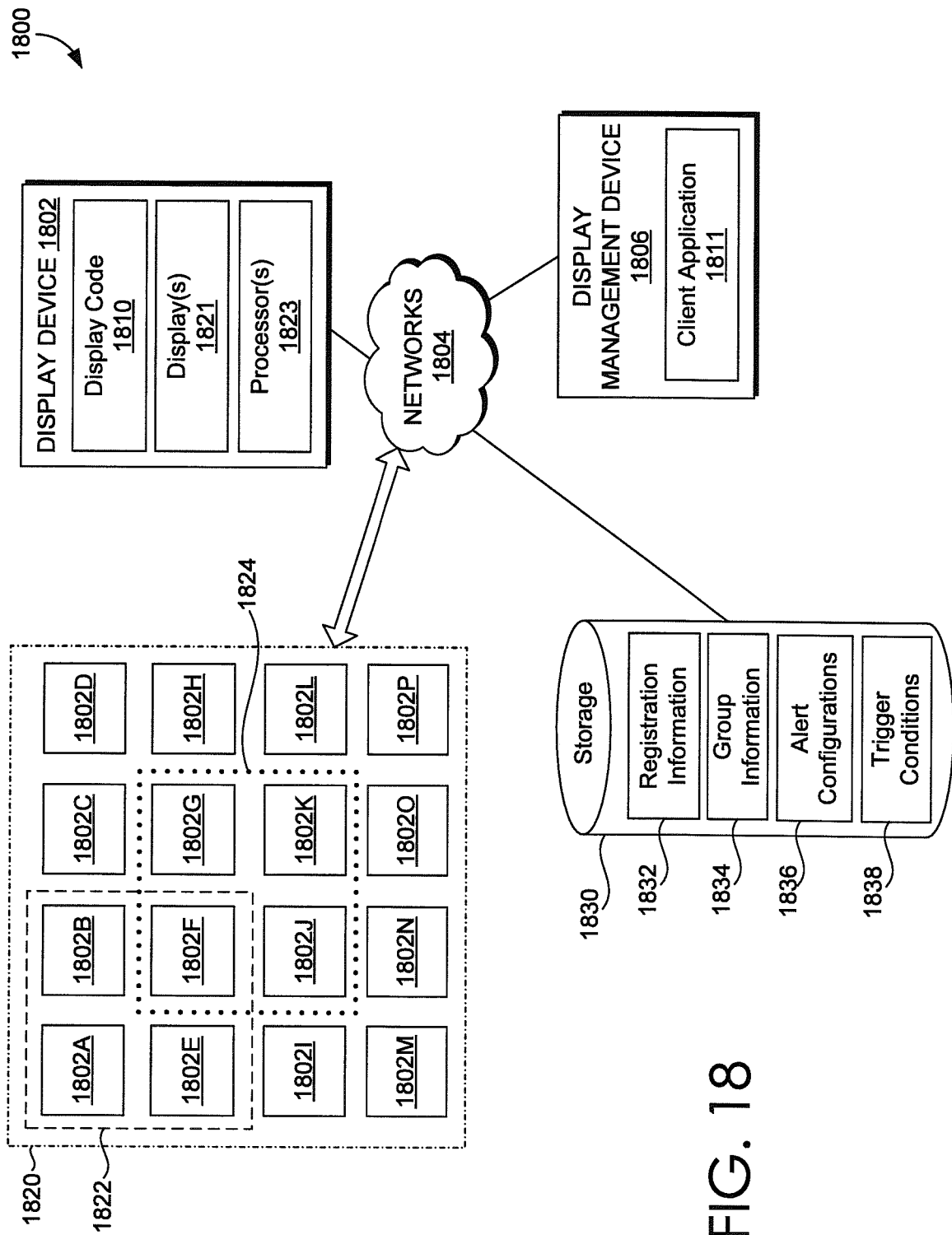
FIG. 18 illustrates an example of a display management system in accordance with the disclosed embodiments.

Examples of suitable display management systems are described below with respect to FIG. 18. FIG. 18 shows display management system 1800 in accordance with embodiments of the present disclosure.

Display management system 1800 can include at least one display management device, such as display management device 1806 and at least one display device, such as display device 1802. By way of example, display management system 1800 further includes display devices 1802A-1802L. Each of the display devices includes at least one display (a physical display), at least one processor hosting the at least one display, and computer instructions executable by the at least one processor to present content, such as data visualizations and sounds, on the at least one display. For example, display device 1802 includes display 1821, processor 1823 hosting display 1821, and display code 1810 executable by processor 1823 to cause content to be presented on display 1821.

For simplicity, the present application may refer to the least one display and the at least one processor in singular, which should not preclude multiples of these components. A display of a display device may be physically integrated into the display device, or may be connected externally, such as over a wired or wireless display connection.

As examples, a display device may be embodied on a personal computer comprising the display connected to the personal computer via a graphics card, a laptop, a dongle coupled to an input port of the display, such as a High-Definition Multimedia Interface (HDMI) dongle or a Universal Serial Bus (USB) dongle, a mobile device, such as a cell phone, a computer monitor, a smart monitor, a smart TV, a projector, any monitor connected to a local processor that controls presentation of images and optionally sound on the monitor, or a TV monitor. Display devices 1802A-1802L can have any combination of these configurations.

A display of a display device can be registered in display management system 1800 to enable another device to cause content to be presented on the display. As used herein, a registered display device refers to a display device which has at least one registered display. In some implementations, registering a display enables a master/slave relationship between a controlling device and the display with respect to the presentation of content on the display. For example, the controlling device can direct or control the presentation of the of the content of the display, despite the display being hosted by the display device. In some implementations, this is includes configuring the registered display device (e.g., display code 1810) to allow the controlling device to push content to the display. As an example, display code 1810 can comprise code of a web page loaded in a web browser (or more generally executable code of an HTTP application). A controlling device can cause data to be sent to display code 1810, such as in a server push message (e.g., an HTTP server push message), which display code 1810 renders on display 1821.

Display management device 1806 is shown as including client application 1811. Client application 1811 comprises instructions, which when executed by at least one processor of display management device 1806, to implement a display management interface, which may be a graphical user interface (GUI), and will later be described in additional detail. As one specific example, client application 1811 may correspond to a web browser hosting the display management interface. The display management interface can be utilized to, for example, set one or more display configuration settings of a registered display. Display management system 1800 can present the content on a registered display based on the display configuration settings. Examples of display configuration settings for a registered display include a display device name, a display group, assignment of schedules, alerts, and/or trigger conditions to a display, and more. In some implementations, display management device 1806 is the same type of device as the display devices described above, but may not include display code 1810.

In some embodiments, display management system 1800 is integrated into networked computer system 100 of FIG. 1. Thus, display management system 1800 can include one or more client devices, such as client devices 102, one or more host devices, such as host devices 106, and one or more data intake and query systems, such as data intake and query system 108. These various components may be coupled via network 1804, corresponding to network 104 of FIG. 1. Further, display management device 1806 may be one of client devices 102 or one of host devices 106. In some cases, client application 1811 corresponds to one of client applications 110 in FIG. 1, which may or may not include a monitoring component, such as monitoring component 112 of FIG. 1. Further, it is noted a client device, a display management device, and/or a host device may serve as a controlling device for a registered display.

Thus, as indicated above, in some cases, client application 1811 may be or comprise a web browser that a user may use to navigate to one or more websites or other resources, such as those provided by one or more host devices 106. As another example, client application 1811 may comprise a mobile application or "app." For example, an operator of a network-based service hosted by one or more host devices 106 may make available one or more mobile apps that enable users of the client devices to access various resources of the network-based service. As yet another example, client application 1811 may include background processes that perform various operations without direct interaction from a user. Although host devices 106 have been described as being separate from the client devices, in some implementations, or more of the client devices can perform the operations of a host device, such as for one or more other client devices.

As indicated above, each of the display devices may be geographically dispersed. In accordance with implementations of the present disclosure, a display management device, such as display management device 1806, can be used to control which data visualizations are or are not rendered on which client device. For example, client application 1811 can be provide a user interface which a user can employ to centrally manage multiple ones of the display devices.

FIG. 18 also includes storage 1830, which can comprise computer-readable media and is configured to store information or data received via the various components of display management system 1800 and provides the various components with access to that information or data, as needed. In implementations, storage 1830 comprises a data store (or computer data memory). Although depicted as a single component, storage 1830 may be embodied as one or more data stores and may be at least partially in the cloud. In addition or instead, storage 1830 may be in one or more of the devices described with respect to FIG. 18, such as display management device 1806. Thus, it should be appreciated storage 1830 may be distributed in any suitable manner across one or more data stores for storage (which may be hosted internally or externally to client devices or host devices).

In the implementation shown, storage 1830 includes registration information 1832, group information 1834, alert configurations 1836, and trigger conditions 1838, which are described in further detail below.

3.2 Display Registration

As described above, in some cases, a display of a display device is registered to enable another device to manage or control its display. Registration information 1832 stores registration information, which generally comprises information that facilitates and/or records the registration of displays. Examples of registration information include registration status information of displays, display identifiers, display credentials, display login information, display access instructions, security keys or tokens, and display accessing credentials.

Figure 19A:
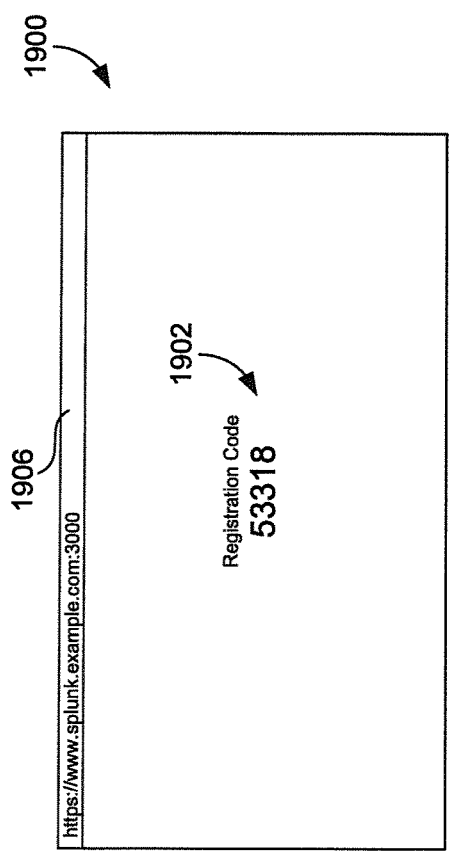
FIG. 19A illustrates an example of a registration user interface in accordance with the disclosed embodiments.
Figure 19B:
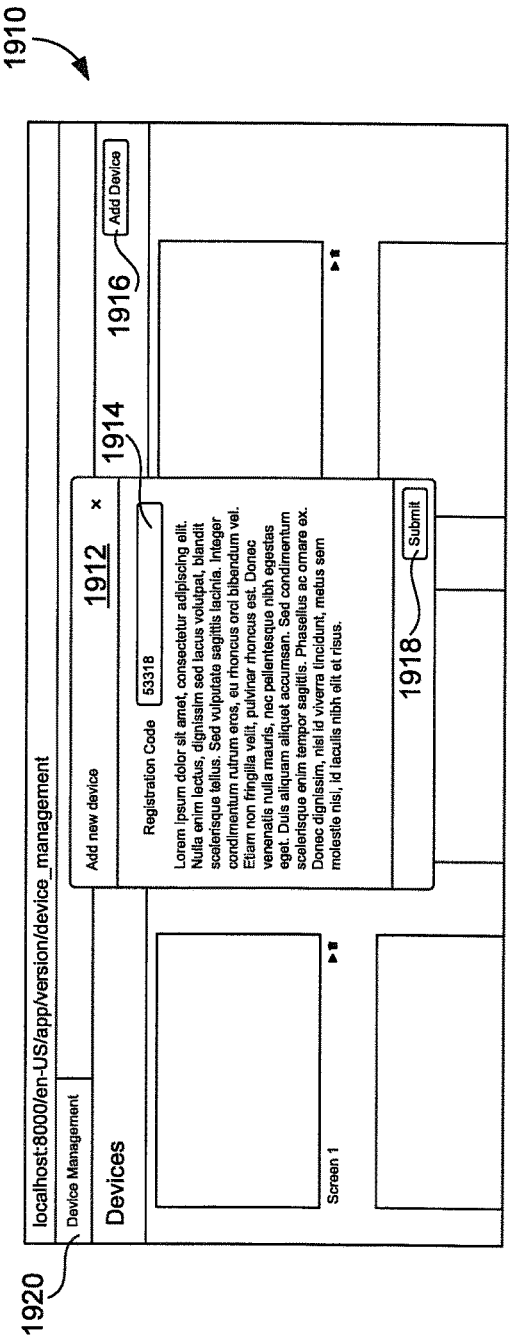
FIG. 19B illustrates an example of a registration user interface in accordance with the disclosed embodiments.

Registration of a display can occur in any variety of ways, which may impact the registration information stored in registration information 1832. For example, in various embodiment, registration may occur with or without authentication. FIGS. 19A through 19B illustrate an example of one suitable approach to display registration. FIG. 19A shows registration user interface 1900 displaying registration code 1902 for a display to be registered in a display management system, such as a display of one of display devices 1802A through 1802P in display management system 1800.

A display may be registered, for example, with one or more host devices, such as host devices 106, which is referred to in singular form for brevity. The host device (e.g., a server), may be configured to perform such functions as managing registration of displays, authentication of display devices and/or displays, exchanging information between display devices (e.g., as an intermediary), maintaining storage 1830, and providing access to storage 1830 in display management system 1800. However, any portion of this functionality may be embodied by display devices, display management devices, or other devices.

As an overview of the implementation shown, a registration service of a host device causes a registration code to be provided for a display (e.g., on the display). A user may then provide the registration code to the registration service to register the display using a registration interface. The registration interface may be presented on a display of a different display device than the display being registered, such as display management device 1806. Further the registration interface may be accessed through a user account managed by the host device, which may require a login and password (e.g., login credentials provided by a user) or other authentication procedure to access. Using the registration interface, the user can optionally configure various display management settings of the display. Once registered, the host device can maintain a connection to the registered display (e.g., via its display device's IP address) and provide (e.g., push) content to the display (e.g., via the display device), such as data visualizations.

The present example is described with respect to registering display 1821 of display device 1802. Each display device in FIG. 18 may be registered in a similar manner. Registration user interface 1900 may, for example, be presented on display 1821 to be registered. For example, the host device can cause registration user interface 1900 to be presented on display 1821. In some implementations, registration code 1902 is provided to display 1821 in response to a request associated with display 1821, such as from display device 1802 hosting the display. In response to the request, the host device can provide registration code 1902 to the display device.

Registration user interface 1900 can be presented on display 1821 by display code, such as display code 1810. As mentioned above, display code 1810 may be running in a web browser. In some cases, registration user interface 1900 is presented on display 1821 in response to a user of the web browser navigating to a URL (Uniform Resource Locator). For example, the request described above could correspond to a request for a web page. The host device can associate the URL, or more generally, the URI (Uniform Resource Identifier), with a registration service such that the request is routed to the registration service. In response, the registration service provides executable code (e.g., JavaScript) to the display device, such as in a web page. The code (e.g., display code 1810) executed by the display device (e.g., rendering the web page) can generate registration code 1902, as well as cause the registration code to be rendered on the display, as shown. The executable code may further cause the display device to provide the generated registration code to the host device for registration of the display. As one specific example, a user could enter "https://www.splunk.example.com:3000" into browser address bar 1906 or display device 1802 may otherwise access the URL to initiate the registration process. The port may direct the communication to the registration service. As an alternative, the registration service could generate the registration code and transfer the registration code to the display device, for example, based on the request.

Registration code 1902 is presented as a numeric code as an example only, and could be in any suitable format, including alphanumeric, a bar code, a CAPTCHA (Completely Automated Public Turing test to tell Computers and Humans Apart), a QR (Quick Response) code, or an image. Registration code 1902 may be any identifier which can be used for authentication of the display or display device with the host device. Registration code 1902 may, for example, be randomly generated. A unique registration code may be generated for each display being registered in display management system 1800. As further examples, a registration code can be, comprise, or be generated from a MAC (Media Access Control) address, display identifier, a serial number, or an IP address associated with the display and/or display device.

FIG. 19B shows registration user interface 1910 of a registration interface in accordance with implementations of the present disclosure. Registration user interface 1910 corresponds to a registration interface and allows a user to register a display by entering or otherwise providing the registration code corresponding to the display to the host device. As indicated previously, the registration interface may be presented on a display associated with a different device than the display being registered (e.g., display management device 1806).

The registration interface can, for example, be provided to client application 1811 on display management device 1806 by the host device. For example, the client application may be a web browser providing the registration interface, including registration user interface 1910, in one or more web pages. To access the registration interface, client application 1811 may be directed to a different URL than the URL which provides the registration code. Also, accessing the registration interface may optionally require a more secure authentication procedure than used to receive a registration code. This could include logging into a user account maintained by the host device, such as with a username and password.

Further, it is contemplated that the registration interface may be integrated with the account described above with respect to subscribing users of a cloud-based service, or of a local service. In particular the account used to access the registration interface may be the same account used to access the various interfaces (e.g., search interfaces or user interfaces), shown and described with respect to the previous figures (e.g., FIGS. 6A, though 7D, 9A, 9B, 9D, and 12 through 17). Further, registration information 1832, group information 1834, alert configurations 1836, and trigger conditions 1838 may be maintained in association with or belong to the account, in addition to the other various preferences and data stored in association the account (e.g., this information may also be in storage 1830).

In some implementations, registration user interface 1910 is accessible via any of the various user interfaces previously show and described. As one example, a user may select a GUI (Graphical User Interface) control element, such as GUI control element 1920 (e.g., a tab), to access the registration interface. The GUI control element may be incorporated into any of those interfaces. For example, the registration interfaces may be part of a display management interface accessible through the GUI control element. Registration user interface 1910 may correspond to a screen of that display management interface, which will later be described in further detail.

As shown, registration user interface 1910 includes registration user interface control element 1912 (e.g., a form) from which the host device can receive registration codes (e.g., from display management device 1806). In the present example, user interface control element 1914 is provided and a user can enter a registration code into the user interface control element (e.g., type the code into a field) to submit the code to the host device.

Registration user interface control element 1912 may be accessed, for example, from the display management interface. In the present example, a user has accessed registration user interface control element 1912 via GUI control element 1916, causing registration user interface control element 1912 to be presented on a display of display management device 1806. The user then types the registration code into user interface control element 1914. To the submit the registration code, the user can select submit button 1918. The host device can receive the submitted registration code and compare the submitted registration code to the registration code associated with the display to be registered (e.g., received from its display device). Where the registration codes match, the host device may register the display. The host device records the registered display in registration information 1832. This can include creating a display profile for the display, including, for example, connection information of the display (e.g., an IP address) and/or other information the host device can use to identify, verify, establish a connection with, and/or communicate with the display, such as to provide data visualizations to the display in the current and/or a future communication session. Each registered display can have a corresponding display profile maintained by the host device (e.g., in storage 1830).

Figure 19C:
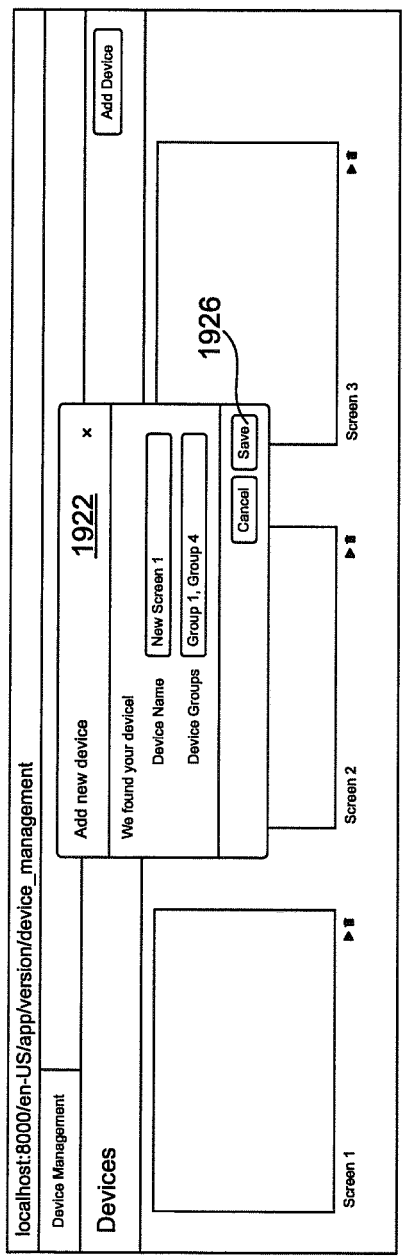
FIG. 19C illustrates an example of a display naming screen in accordance with the disclosed embodiments.

Each registered display may include in its device profile a respective display identifier (e.g., a unique identifier, such as a universal unique identifier), which may be assigned to the display by the display management system. In some cases, a display device hosts multiple displays and each display has a respective display identifier, and such that content presented on the display can be managed and controlled separately from other displays. Also, each registered display many optionally include a device name, which may be presented in the device management interface to identify the display to users. The device name may be generated, as an example, by the host device, or by a user (e.g., via the display management interface). FIG. 19C shows display configuration user interface control element 1922, which allows a user to enter, or set, a display name (or more generally display label) for a display. In the present example, display naming screen 1924 is part of the registration interface, by way of example only. The host device may cause display naming screen 1924 to be presented (e.g., automatically after a user selected submit button 1918) to a user based on a valid registration code having been entered in registration user interface control element 1912 of FIG. 19B.

As shown, the user has labeled the display "New Screen 1" in FIG. 19C. Selecting GUI control element 1926 can cause the host device to save the display name to the display profile. It should be appreciated that device naming need not be incorporated into the registration flow. Optionally, the user may configure other settings for the display. This can include any of the various display configuration settings described herein, such as display tags, assignment of content to the display, assignment of alerts to the display, and display groups. In the example of FIG. 19C, the user is assigning the display to two groups: "Group 1" and "Group 2." Providing the groups to the display configuration user interface control element 1922 is one specific example of how the user can assign a display to a display group. As mentioned previously, display tags and/or devices properties could also be used by the user and/or the host device to define groups of displays. These items may be configured as part of display registration similar to what is shown for display groups, although particular user interface control element elements may differ. Further similar to display groups these display configurations may be configured separate from display registration and/or after display registration (e.g., updated).

Examples of display tags include device locations, job types, display properties, operational groups, and the like. In some case the user is provided a predefined list of available tags for each of these categories. Display tags available for assigning to displays include system defined tags and user defined tags. Device location tags could be associated with or correspond to one or more maps or schematics, such as building floorplans, office locations, and geographic maps, which could be viewable in the interface. Display properties may include display device and/or display properties, which represent characteristics of the display and/or display device, such as display region or geography, location, display resolution, display size, and the like. Another example of display properties include display resource properties, which represent computing resources available to the display. Examples of display resource properties include hardware resources, such as processing power, memory, GPU (Graphics Processing Unit) resources, CPU (Central Processing Unit) resources, device type (e.g., mobile, desktop, laptop, tablet), and the like, and software resources, such as applications, applications versions, browsers, operating system, browser type, and the like. In some cases, display properties are extracted from the display device associated with the display. For example, the host could receive this information from the display code or from an application hosting the display code (e.g., a web browser). Geography may be determined using IP (Internet Protocol) lookup or other geolocation resolving techniques.

3.3 Providing Content to Displays

Having registered a display, the host device can provide content to the display. It is noted that there are many suitable approaches to registering a display. Display registration may be persisted for later use and connections to the display, or may be ad hoc, in some implementations. Furthermore, it should be appreciated that authentication need not be required with respect to the display. As in example, in some cases, a user could direct a display device to a designated URL thereby establishing a display connection with the host device and thereby receiving content, such as data visualizations from the host device. A registration code need not be entered by a user account associated with the content provided to the display.

Figure 19D:
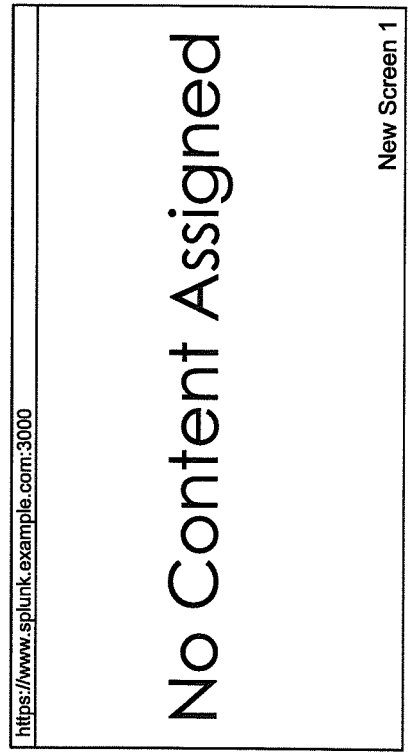
FIG. 19D illustrates an example of a display connection screen in accordance with the disclosed embodiments.
Figure 19E:
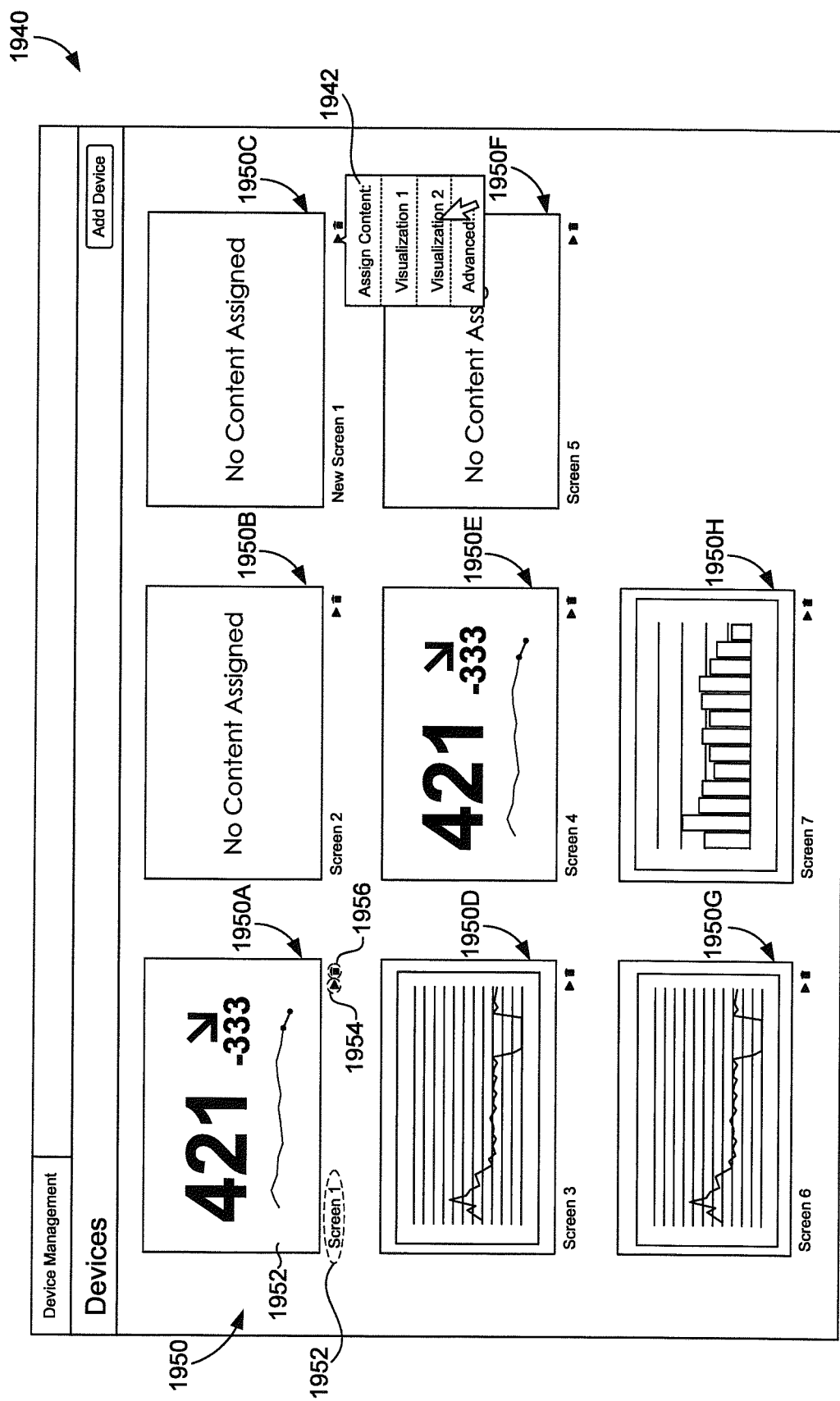
FIG. 19E illustrates an example of a display management screen in accordance with the disclosed embodiments.

The host device providing content to a registered display can include pushing content to the display via a display connection. For example, the display connection may be established based on the user having entered a valid registration code. Display connection screen 1930 of FIG. 19D shows an example of a registered display presenting content from a display connection. For example, display connection screen 1930 could be displayed on display 1821 upon the user completing registration of the display, such as by saving the display configurations using GUI control element 1926. In some implementations, the display connection is established over the same connection used to provide registration code 1902 to the display device. For example, the executable code and/or web page can be used to present content on the display received over the display connection.

As indicated previously, a registered display may display content assigned to the display by the host device and/or a user (e.g., in association with a user account), such as a set of data visualizations and the like. FIG. 19D shows default content, which may be displayed when no content is assigned to the display. At least some of the default content need not be provided over the display connection. Had for example "Group 1" been assigned content, that content may be presented in FIG. 19D.

3.4 Display Management Screen

A user can optionally assign content to one or more registered displays from a display management screen of the display management interface, such as display management screen 1940. For example, display management screen 1940 shows a user assigning content to the display from GUI control element 1942 (e.g., a form) shown as a drop down contextual menu. GUI control element 1942 presents a list of available visualizations that the user may selectively add to content, remove from content, and/or replace in content presented on the corresponding display. Although GUI control element 1942 is shown with respect to an individual display, a similar approach could be used for display groups. The data visualizations in list can be predefined data visualizations, which have corresponding underlying data and/or data visualization templates. In some cases, the host device auto populates the list with data visualizations based on the visualizations currently loaded by the user account. For example, the data visualizations may be open in another tab, window, or screen of the user interface, which could correspond to FIG. 6A, 7D, 9A, 9B, 9D, 14, 15, 16, or 17. As another example, one or more data visualizations may be included based on being predefined by a user in association with the user account. Display management screen 1940 is one example of this approach, but a similar approach could be used with any suitable screen. Further, display management screen 1940 need not include this functionality in all embodiments.

Display management screen 1940 can act as a hub for display management, and is configured to present a list of registered displays 1950 comprising all or some available registered displays and/or all active or connected registered displays associated with the user account. In the example shown this includes at least registered displays 1950A, 1950B, 1950C, 1950C, 1950D, 1950E, 1950F, 19506, and 1950H. FIGS. 19B and 19C described previously can optionally correspond to display management screen 1940. For example, upon registering a new display, such as display 1821, the display may be added to registered displays 1950 on display management screen 1940. In the present example, registered display 1950C can correspond to the added display.

As shown, registered displays 1950 are arranged in a grid format. As examples, each registered display can be presented in association with its display name or label, an assigned content indicator, and one or more GUI control elements corresponding to the registered display, as shown. For example, the assigned content indicator can be an indication of the content currently being presented on the display (i.e., active content). In the present example, the assigned content indicator is a thumbnail image the host device captured from the assigned content of the display. For example, registered display 1950A includes assigned content indicator 1552. The host device can update the assigned content indicator based on updates to the assigned content for the display. In the present implementation, a static image is displayed, but it is contemplated a video feed or transitioning images could be displayed. As another example, the assigned content indicator could be a name of the currently active or assigned data visualization or other content.

GUI control element 1954 can be used, for example, to assign data visualizations to the display, as described with respect to registered display 1950C, and/or to selectively pause or stop and play assigned data visualizations on the display. These actions may cause the host device to provide corresponding commands to the display device associated with the display and/or be implemented on the host device by pushing or providing updated content to the display in response to the GUI control element (e.g., via display code 1810). GUI control element 1956 can be utilized to remove a registered display from the host system (e.g., delete the display profile and/or associated registration information from storage) and/or the list of registered displays.

3.5 Additional Examples of Display Content Assignment

FIGS. 6A, 7D, 9A, 9B, 9D, 14, 15, 16, 17, 20A, and 20B illustrate additional examples of assigning content to registered displays. Those figures are shown as including GUI control 2010, which a user can select to assign content to one or more displays and/or remove content from the one or more displays. Upon updates to assigned content, the host device may push or provide an update to the display or displays, such that the associated display or displays are automatically updated to reflect the changes. For example, GUI control 2010 corresponds to assignment control element 2012, which may optionally be presented in data visualization screen 2000 in response to receiving a user selection of GUI control 2010 (or from a right click or other predefined user input or action).

Assignment control element 2012 can include a list of displays and/or groups of displays for the updates to the content. In some cases, this list is generated based on the currently connected displays. In the example shown, the list is of available groups for assignment of content, which may be determined from or stored in group information 1834 (e.g., from display prosperities, display tags, or explicitly defined groups). In assignment control element 2012, groups in the list correspond to groups 1820, 1822, and 1824 of FIG. 18. Group 1820 includes all displays associated with the user account. Group 1822 includes displays hosted by display devices 1802A, 1802B, 1802E, and 1802E Further, group 1824 includes displays hosted by display devices 1802F, 18026, 1802J, and 1802K. As an example, group 1822 may correspond to all displays on a first floor of an office building and group 1824 may correspond to all displays on a second floor of the office building. As another example, group 1822 could correspond to all displays associated with an IT department and group 1824 could correspond to all displays associated with a network security department.

The updates made to assigned content using assignment control element 2012 can contextually correspond to the data visualization or visualizations currently being presented and/or configured in the interface. In the present example, data visualization 2020 is currently being presented in data visualization screen 2000. As an example, selection of group 1822 in assignment control element 2012 can cause the host device to automatically cause data visualization 2020 to be presented on all displays in group 1822. Similar actions could be performed from removing data visualization 2020 from the displays. Further, the displays may add and/or remove data visualization 2020 from currently displayed data visualizations or replace any currently displayed data visualizations with data visualization 2020. Where multiple data visualizations are available on the screen, the user may be given the option to select which data visualizations or visualizations to include or remove from display on registered displays. For example, with respect to FIG. 6A, the user could optionally select between timeline 605 and events list 608, or both may be included based on the selection (e.g., all data visualizations corresponding to the screen).

Figure 20A:
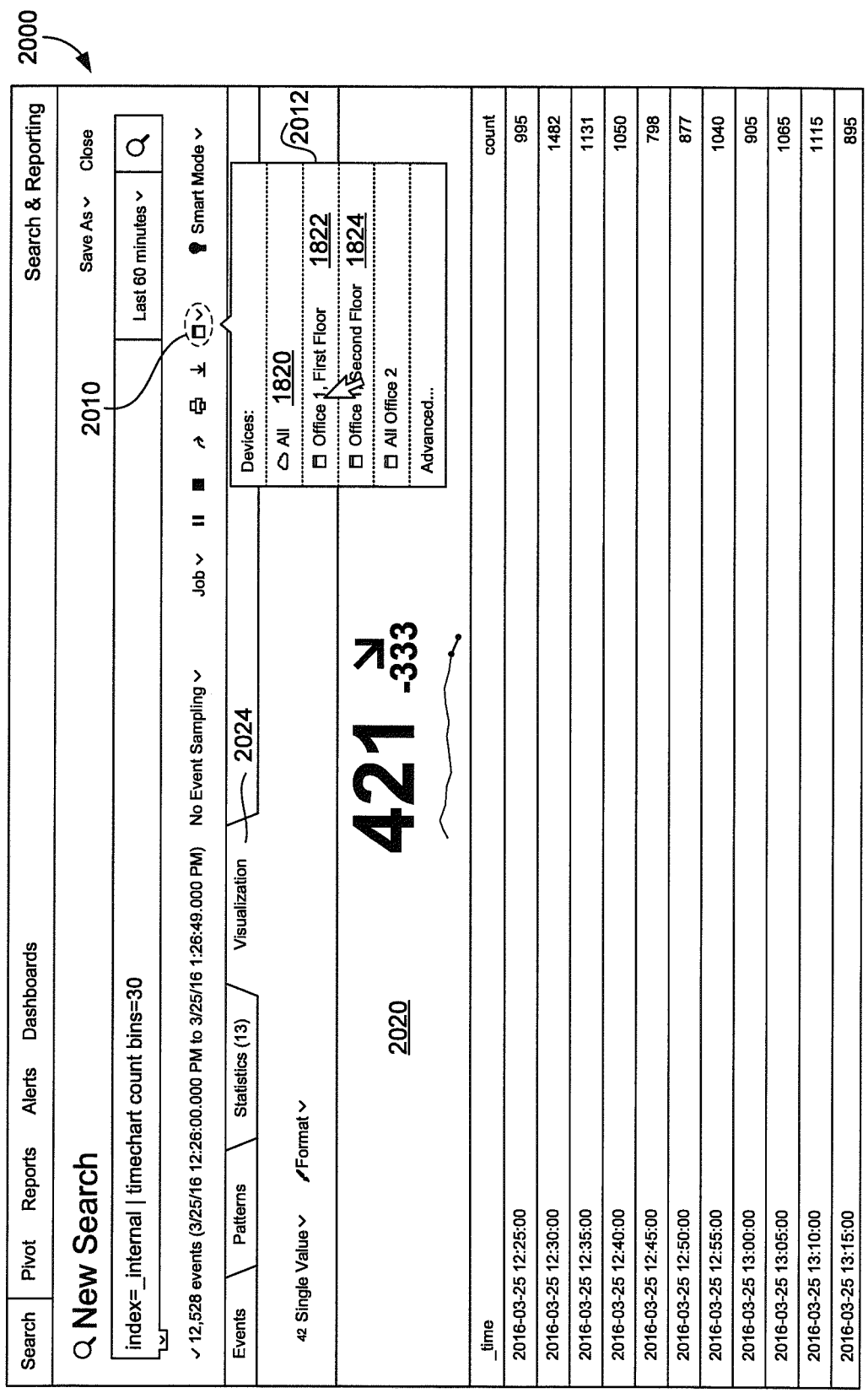
FIG. 20A illustrates an example of a data visualization screen in accordance with the disclosed embodiments.
Figure 20B:
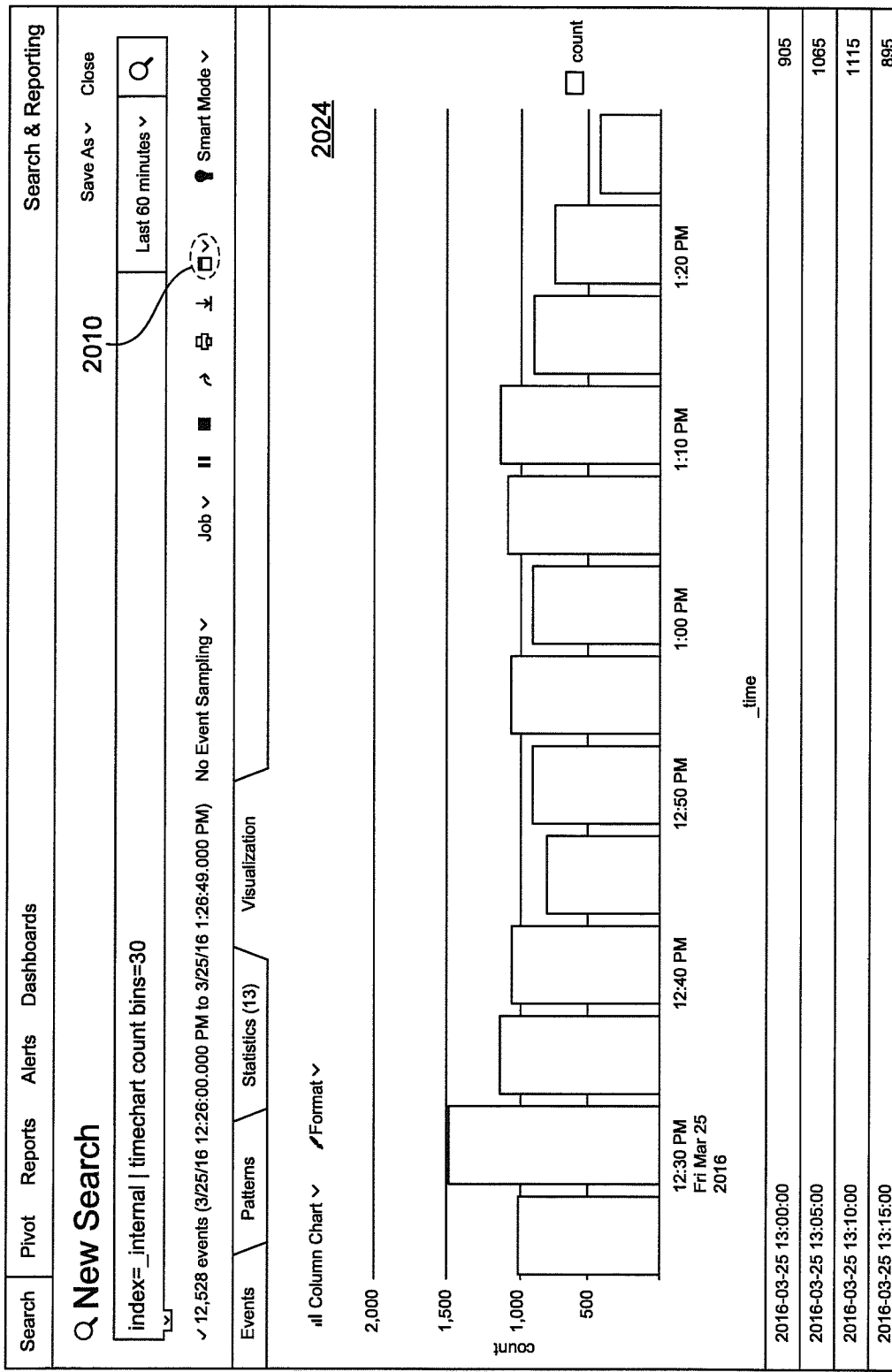
FIG. 20B illustrates an example of a data visualization screen in accordance with the disclosed embodiments.

Data visualization 2024 is another example of a data visualization, which may be provided for presentation of a registered display. As indicated in FIGS. 20A and 20B, at least some of the data visualizations may be available to the user from a data visualization tab, or data visualization screen. This GUI control element can correspond to data visualization tab 624 of FIG. 6A. The data visualizations available through the GUI control element can use, for example, the search results corresponding to events list 608 as the underlying data of the data visualizations.

In some implementations, the user may selectably configure one or more of the registered displays and/or groups to mirror the data visualizations being presented on a display corresponding to the display management interface (e.g., of display management device 1806). For example, as a user navigates to different data visualizations, the registered displays can be automatically updated to present those data visualizations (e.g., to always show the same data visualizations as the controlling or managing device and/or display). As with other implementations described herein, when settings of those data visualizations are changed (e.g., by a user), those changes can automatically be reflected on the registered displays. Further, it is contemplated that any of the various data visualizations described herein can be dynamic and can be automatically updated, for example, based on changes to the underlying data.

Also, in some implementations, on a registered display device, a user may be restricted from manipulating or altering the displayed data visualization (e.g., by the display code and/or application or web page hosting the display code). In addition or instead, the user may have different access permissions to the data visualizations than via the display management interface. For example, the user may be restricted from modifying which data visualizations are or are not presented on the display. In some cases, the user may be permitted to alter settings of presented data visualizations. In some implementations, the user may have similar permissions as a user via the display management interface. The user may, using the registered display device, use a data visualization provided by a controlling device as a starting point and interact with and modify the data visualization in some manner and/or explore or modify the underlying data. These actions may in some cases be restricted based on the data visualizations assigned to the registered display. For example, the user may only be permitted to interact with the search results (e.g., further narrow the search query or data set), such as using various search screens described herein.

Thus, it should be appreciated that in some implementations, registered displays may be provided with content directly from a search interface. Further, it should be appreciated that using implementations described herein, a user may investigate data (e.g., raw data) in a user interface, and selectably push content to one or more particular registered displays directly from the user interface. As an example, as a user is performing searches on data, developing schema, and/or otherwise investigating a data set, interesting results may be pushed to displays via data visualizations without requiring extensive configuration of those displays, enabling consistent and immediate display of data amongst multiple displays.

3.6 Content Triggering and Scheduling

As mentioned above, implementations of the present disclosure provide for trigger conditions (e.g., trigger conditions 1838) for providing content to registered displays, such as the registered displays described above. The host device may evaluate whether trigger conditions are satisfied. In response to determining a set of trigger conditions are satisfied, the host device may automatically provide (e.g., push) one or more corresponding data visualizations to one or more corresponding registered displays. This can cause the set of associated data visualizations to be presented on the set of registered displays. Suitable data visualizations include those described above and depicted in the various figures herein.

In some implementations, a set of trigger conditions corresponds to a schedule for display of a set of data visualizations on one or more registered displays. For example, a user and/or the system may assign the schedule to one or more particular displays and/or display groups in the display management interface. A schedule for display of a set of data visualizations, or display schedule, generally defines an order the host device uses to determine which data visualization or visualizations to cause to be presented on a set of registered displays. The order can be defined by the trigger conditions, which can be defined in terms of time, incident occurrence, user action, and the like, by the system and/or a user. Typically, a set of trigger conditions is defined for a subset of all of the data visualizations defined in the system and different subsets may be associated with different trigger conditions, and registered displays (e.g., display groups).

In various implementations, a user can configure any combination of these settings in the display management interface. For example, the user may, using the user interface (e.g., a scheduling interface or editor), create a display schedule, assign particular displays to the schedule, assign particular data visualizations to the schedule, define an order, or rotation (e.g., the user can set or enter in the time between changes to the data visualizations for a cycle of visualizations), of display for the data visualizations of the display schedule, and/or define which registered displays should implement the display schedule. The user can selectably save and/or update these schedule configurations of schedules in the user interface, causing the host device to automatically apply the display schedule to the corresponding displays.

3.7 Content Prioritization and Display Alerts

As will be appreciated from the forgoing, trigger conditions can correspond to rules a host device uses to determine which content should be presented on or more registered displays. In some implementations, different sets of trigger conditions may be satisfied concurrently for one or more registered displays. In these cases, the host device can be configured prioritize one of the sets of trigger conditions over others. For example, the system and/or the user can define priority levels or settings for sets of trigger conditions and/or types of trigger conditions. This may be defined, for example, with respect to or in schedule configurations of schedules and/or alert configurations of alerts.

Where a set of data visualizations is being presented on a set of registered displays, the host device may interrupt the presentation based determining a higher priority set of trigger conditions is satisfied compared to the current set of trigger conditions. For example, the host device may interrupt a display schedule based on a higher priority set of trigger conditions becoming satisfied. Optionally, when no higher priority set of trigger conditions are satisfied, the host device may return control to the lower priority set of trigger conditions.

One type of trigger conditions, which may optionally have the highest priority in the system, or at least a higher priority than display schedules, are display alerts, which include a set of trigger conditions associated with an alert, and have been described above. As used herein, a "display alert" refers to any alert presented on a display and/or designated by the display management system and/or a user for presentation on a display (e.g., in saved alert settings for the alert). In one use case of display alerts, when the host device detects a noteworthy occurrence (e.g., defined by the set of trigger conditions), such as a virus outbreak in a company's network, a security dashboard or other relevant data visualizations can automatically be presented on relevant registered displays.

At alert can comprise various alert settings and definitions stored as alert configurations of the alert (e.g., some of alert configurations 1836). As indication above, these alter configurations can include at least one trigger condition of the alert.

In some implementations, a set of trigger conditions, such as for display alerts, are based on user defined search results or a data set, such as those corresponding to events list 608 in FIG. 6A, which may be defined in the alert configurations. For example, the host device may execute a search query defined by the set of trigger conditions, and analyze the search results to determine whether to trigger an alert. Display alerts can be used to monitor for and respond to specific events. They may use a saved search to look for events in real-time or on a schedule. Further, a display alert may trigger when search results meet specific conditions (e.g., user defined conditions).

In some examples, scheduled display alerts may be defined in alert configurations to evaluate searches for alerting according to a schedule. The user may choose from available timing options or use a cron expression to schedule the search. Real-time display alerts may be defined to be evaluated each time a new search result becomes available. As another option, real-time display alerts may be defined to be evaluated in a rolling time window. The user may specify conditions for triggering the alert based on result or result field counts within a rolling time window. For example, a real-time alert can trigger whenever there are more than ten results in a five minute window.

Figure 21A:
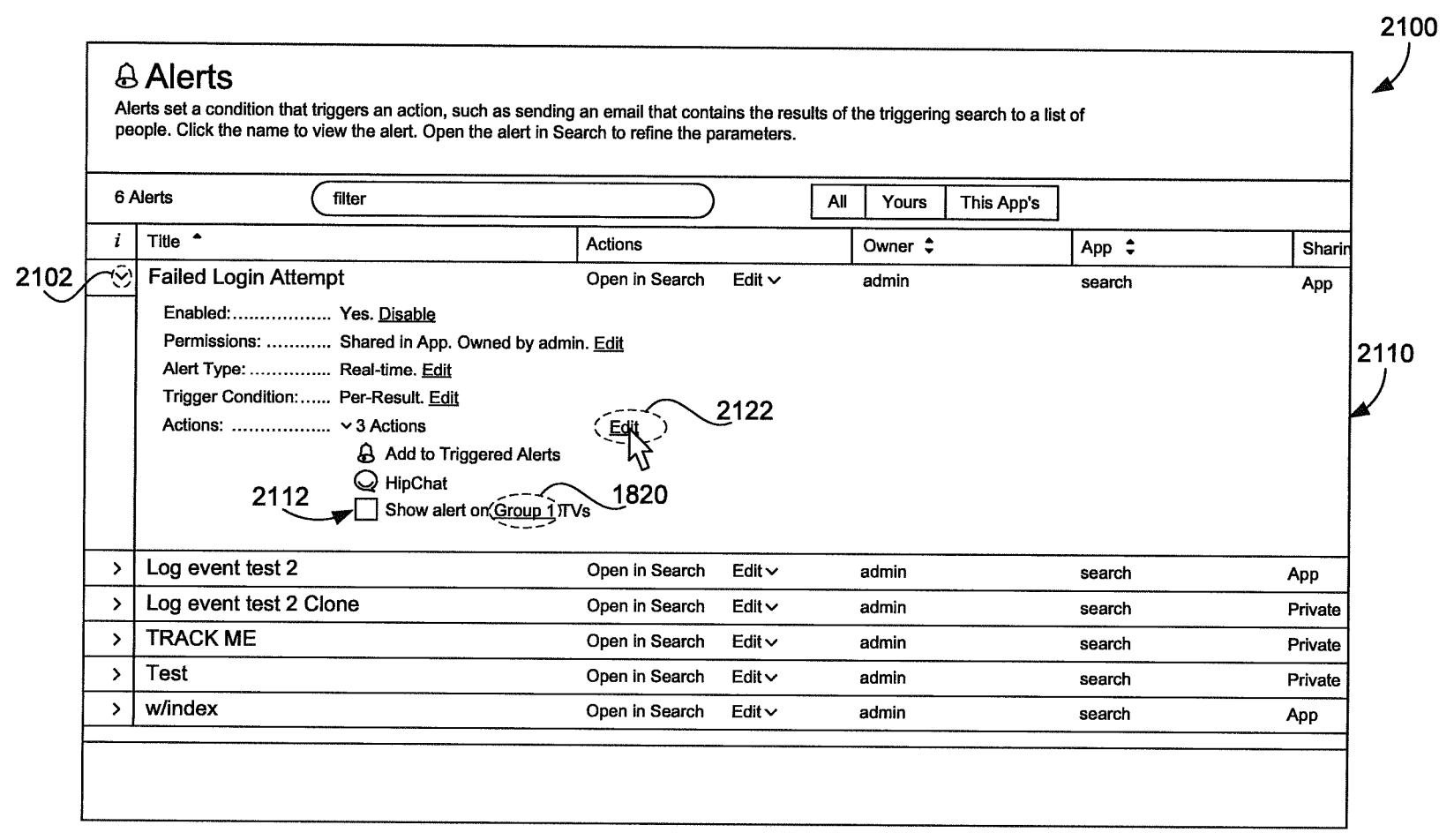

FIG. 21A illustrates a display alert configuration interface in accordance with implementations of the present disclosure. The display alert configuration interface can be used by a user to define and provide alert configurations via user input, can be part of the display management interface described above, and may be accessed from any of the various screens provided herein. Alert configuration screen 2100 includes a list of alerts (e.g., display alerts) associated with the user account, each having a set of alert configurations. Each alert is associated with a corresponding GUI control element (e.g., a down carat), which the user can interact with the selectable hide and reveal alert setting of the alert. For example, GUI control element 2102 corresponds to display alert 2110. Using the display alert configuration interface, the user can establish new alerts and/or modify existing alerts. The can include the user providing (e.g., via user input to one or more user interface control elements) an alert name for each display alert, examples of which are shown in FIG. 21A and include "Failed Login Attempt," "Log event test 2," "Log event test 2 Clone," "TRACK ME," "Test," and "w/index".

As shown, alert settings allow the user to enable or disable a particular display alert, alter permissions for the display alert (e.g., which user accounts can edit the alert), select an alert-type (e.g., scheduled or real-time, as described above), defined trigger conditions (e.g., predefined settings for the predefined alert types), and define or set actions the host device should take in response to determining the trigger conditions are satisfied. Action 2112 includes immediately presenting the set of data visualizations and/or other content associated with display alert 2210 of each registered display in group 1820.

A user has set the group for display alert 2210 to group 1820, and may edit the associated group using alert configuration screen 2100. For example, a user can selectively edit display alert 2110 by selecting GUI control element 2122, which is shown as an edit link.

Figure 21B:
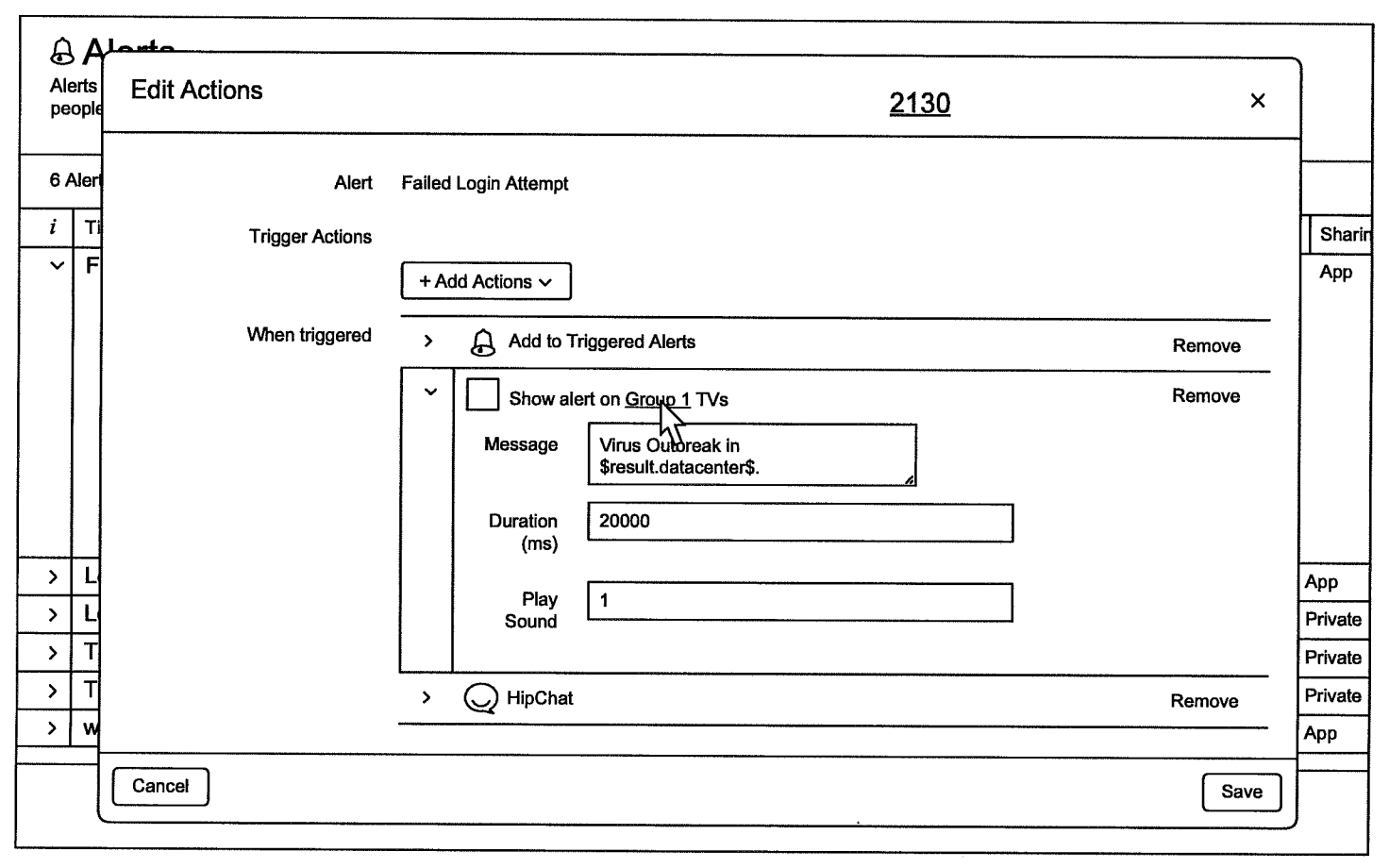

FIG. 21B shows alert configuration element 2130, which may be presented based on selection of GUI control element 2122. Using alert configuration element 2130, the user can set the particular registered displays and/or display groups corresponding to the action. Further, the user can provide an alert message, which may be included in the content presented to registered displays when the alert is triggered, such as "Detected failed login attempt by $result.user$." In this case, $result.user$ can be a variable the host device fills in with a field value of an event from search results. As another example, the alert message could read "Virus Outbreak in $result.datacenter$," where $result.datacenter$ can indicate a field name for the variable. Also shown is a duration for the alert to be presented on registered displays. Further, the user can assign an alert sound to play during presentation of the alert (e.g., on the host client device and/or display speakers).

An update for a display can comprise content for the display. In some implementations, the content comprises a set of data visualizations to replace or add to one or more currently displayed data visualizations. In addition or instead, an update can modify content of one or more currently displayed data visualizations, such as by changing colors, text formatting, or other display attributes of a data visualization. In addition or instead the update can include additional content to present on the display in addition to or instead of data visualizations, such as one or more images, videos, audio (e.g., an alert sound which may be in an audio file or stream), banners, animations, high contrast colors, and the like. Visual content may be embedded within one or more presented data visualizations, displayed over one or more of the data visualizations (e.g., overlie), and/or displayed alongside one or more of the data visualizations.

Each alert may comprise, for example, one or more trigger conditions, an alert type, one or more actions, and/or other alert parameters. One or more of these parameters may be assigned to an alert by the user in the user interface and/or the system. For example, via the user interface, a user may set up various alerts for corresponding displayed and/or display groups. When an alert is triggered, each display associated with the alert can be updated, such that users across different geographies are instantaneously notified in a noticeable fashion, allowing them to take immediate action.

Figure 21C:
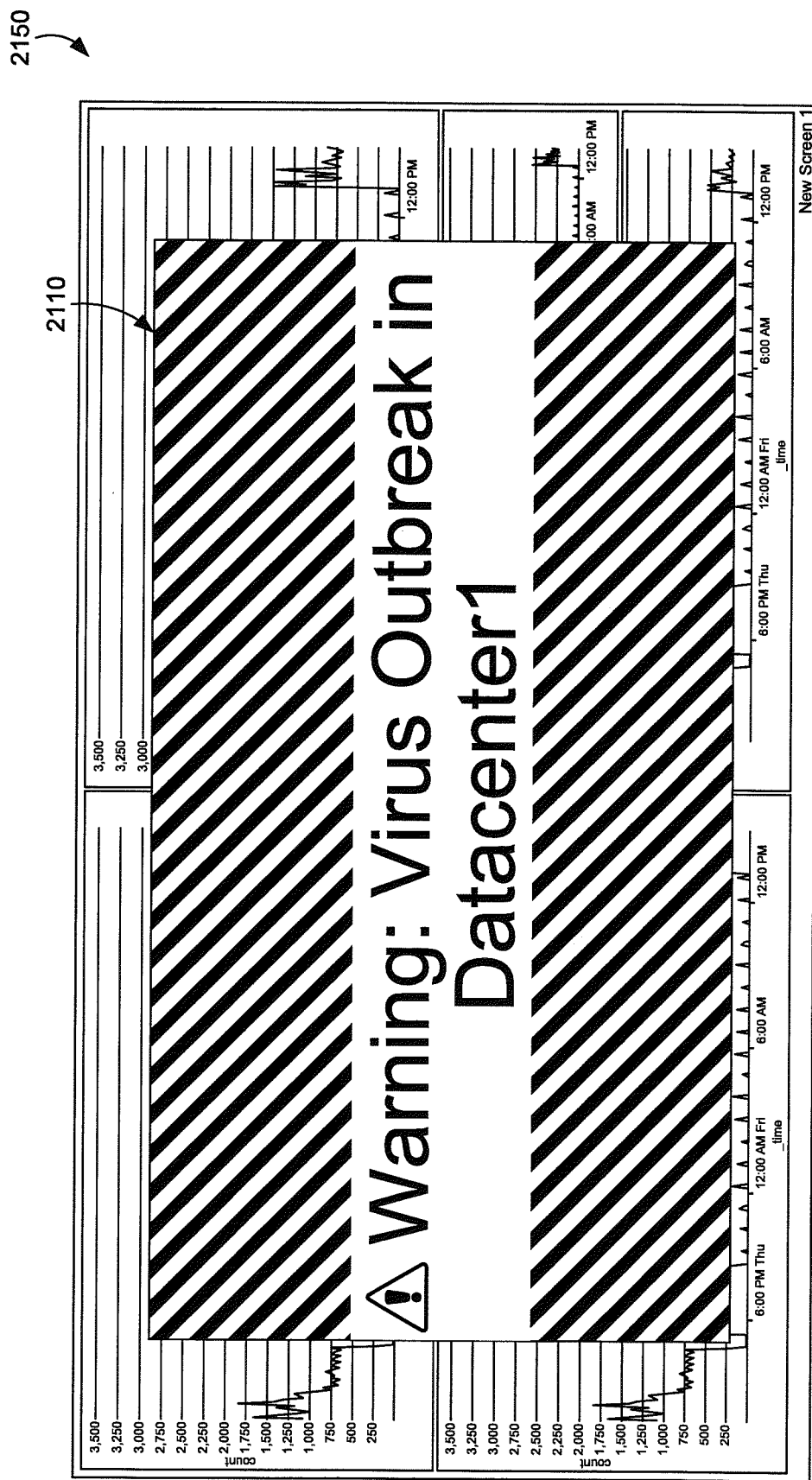
FIG. 21C illustrates an example of a display connection screen in accordance with the disclosed embodiments.

FIG. 21C shows an example of a display connection screen presenting a triggered display alert in accordance with implementations of the present disclosure. In particular, display connection screen 2150 may be depicted on each display in group 1820 based on the host device determining trigger conditions of display alert 2110 are satisfied. In the present example, display alert 2210 overlies a set of data visualizations, and may be presented over the currently displayed set of data visualizations (e.g., of a display schedule or from a manual push of data visualizations made by a user) at the time the alert was triggered.

3.8 Additional Implementations

Figure 22:
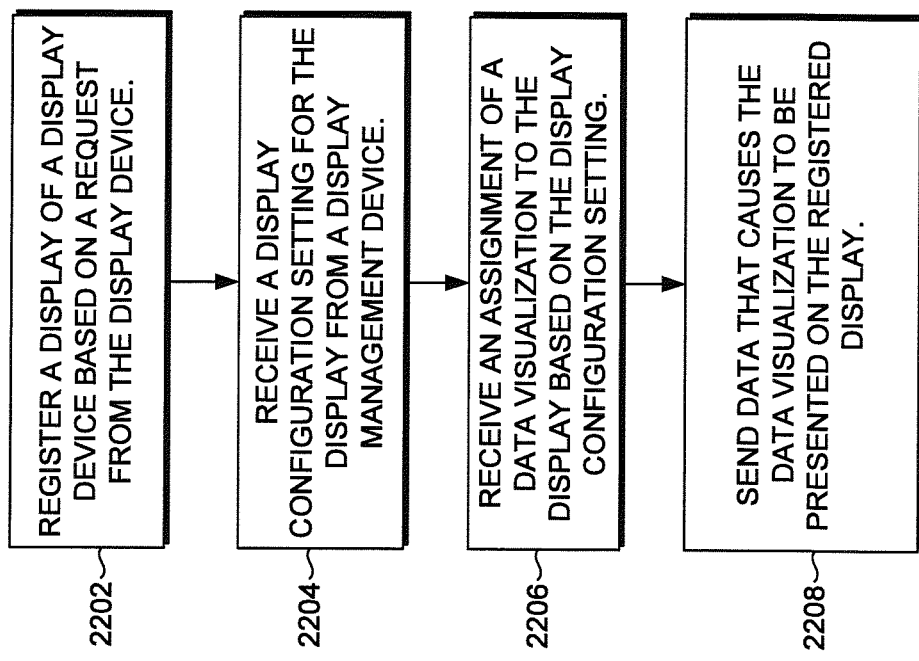
FIG. 22 presents a flowchart illustrating a method in accordance with the disclosed embodiments.

FIG. 22 presents a flowchart illustrating a method in accordance with the disclosed embodiments. Each block illustrating methods in accordance with FIG. 22, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 2202, the method includes registering a display of a display device based on a request from the display device. For example, a host device can register display 1821 based on receiving a request from display device 1802.

At block 2204, the method includes receiving a display configuration setting for the display from a display management device. For example, the host device can receiving display configuration settings for display 1821 from display management device 1806. The host device can store this information in a display profile of the display.

At block 2206, the method includes receiving an assignment of a data visualization to the display based on the display configuration setting. For example, the host device can receive user input (e.g., via display management device 1806) indicating an assignment of a data visualization of analytics data to display 1821.

At block 2208, the method includes sending data that causes the data visualization to be presented on the registered display. For example, the host device can send (e.g., push) data to display device 1802 in response to the receiving of the user input indicating the assignment, which causes display code 1810 to present the data visualization on display 1821 based on the display configuration setting.

Figure 23:
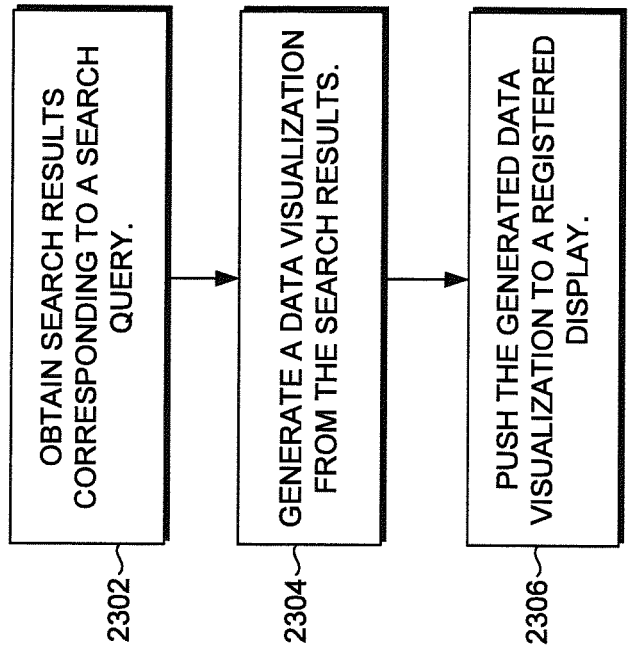
FIG. 23 presents a flowchart illustrating a method in accordance with the disclosed embodiments.

FIG. 23 presents a flowchart illustrating a method in accordance with the disclosed embodiments. At block 2302, the method includes obtaining search results corresponding to a search query. For example, a host device can obtain search results corresponding to a search query provided using a search bar in FIG. 20A.

At block 2304, the method includes generating a data visualization from the search results. For example, the host device may generate data visualization 2020 from the search results.

At block 2306, the method includes pushing the generated data visualization to a registered display of a display device. For example, the host device may push data visualization 2020 to display 1821 in response to a user selecting group 1820 using assignment control element 2012.

In various implementations, a computer-implemented method of display management includes obtaining search results corresponding to a search query, generating a data visualization from the search results, and pushing the generated data visualization to a registered display of a display device, the pushing causing presentation of the generated data visualization on the registered display.

The method can also include registering the display based on receiving a request from the display device.

The pushing can be in response to determining a set of trigger conditions assigned to the data visualization is satisfied based on an evaluation of the search results.

The method can further include receiving from a display management device, user input indicating an assignment of the display to a group of registered displays, wherein the pushing of the data visualization is based on the registered display being assigned to the group.

The pushing can be in response to receiving from a display management device, a user selection of a GUI control element in a search interface presenting at least some of the search results.

The pushing can be to synchronize the registered display with a reference data visualization presented on a display management device.

The pushing can be based on the registered display being configured to mirror data visualizations presented on a display management device.

The pushing can be to a web page presented on the registered display.

The search results can comprise events, each event comprising a time stamp and a portion of raw machine data.

The pushing can be in response to determining a trigger condition of a display schedule is satisfied, the display schedule defining a display order for a set of data visualizations on the registered display.

The method can further comprise pushing a display alert to the registered display in response to determining, based on an analysis of the search results, a threshold value of the display alert is exceeded.

The method can further comprise pushing a display alert to the registered display, the pushing causing the display alert to overlie the presented data visualization.

The method can further comprise sending data causing presentation of an alert configuration interface on a display management device, receiving, from the displayed alert configuration interface, user input indicating an assignment of a set of trigger conditions to a display alert, and pushing the display alert to the registered display based on determining the set of trigger conditions is satisfied.

The method can further comprise in response to determining a first set of trigger conditions assigned to the data visualization is satisfied and a second set of trigger conditions assigned to a set of data visualizations is satisfied, selecting the data visualization for the pushing based on the first set of trigger conditions being associated with a higher priority than then second set of trigger conditions.

The method can further comprise pushing a given data visualization to the registered display causing the generated data visualization to be replaced by the given data visualization on the registered display based on the given data visualization being associated with a higher priority set of trigger conditions than the generated data visualization.

The method can further comprise, executing the search query, the executing applying a late binding schema to events for the search results.

The pushing of the generated data visualization can be in response to determining a trigger condition is satisfied based on analyzing field values extracted from events of the search results using an extraction rule that defines a field of the events.

The method can further comprise pushing a display alert to the registered display based on determining a user assigned trigger condition of the display alert is satisfied, the determining evaluating the search results as new search results become available to the data visualization.

The presented data visualization can be dynamically updated based on the search results as new search results become available for the data visualization.

In various implementations, a computer-implemented method of display management includes registering a display of a display device based on receiving a request from the display device, receiving user input indicating a display configuration setting for the display from a display management device, receiving user input indicating an assignment of a data visualization of analytics data to the registered display based on the display configuration setting, and in response to the receiving of the user input indicating the assignment, sending data that causes the data visualization to be presented on the registered display.

The method can further comprise in response to the receiving of the request, causing presentation of a registration code on the display, receiving, from the display management device, a user provided registration code, and performing the registering of the display based on determining the user provided registration code corresponds to the registration code.

The display configuration setting can assign the display to a group of registered displays, the assignment of the data visualization is to the group, in response to the receiving of the user input indicating the assignment, the data causes the data visualization to be presented on each registered display of the group.

The method can further comprise determining a geographic location of the display, and assigning the display to a group of registered displays based on the determined geographic location, where the user input indicates the assignment of the data visualization to the group o of registered displays.

The request can be from a web browser on the display device and the sending of the data causes the data visualization to be presented in the web browser.

The sending of the data can cause a presented data visualization to be replaced with the data visualization on the registered display.

The method can further comprise in response to the receiving of the request, sending data causing presentation of a web page on the display, wherein the sending of the data causes the data visualization to be presented on the web page based on the registering of the display.

The analytics data can corresponds to events, each event comprising a timestamp and a portion of raw machine data.

The analytics data can correspond to a set of search results of a search query and the method can further comprise receiving an update to the set of search results, updating the analytics data based on the received update, and sending update data causing the data visualization presented on the display to be automatically updated to correspond to the updated analytics data.

The method can further comprise sending display data that causes presentation of a display management screen comprising a list of registered displays including the display, each registered display in the list being presented in association with a visual indicator of a corresponding data visualization assigned to the display.

The method can further comprise sending display data that causes presentation of a display management screen comprising a list of registered displays including the display, each registered display in the list being presented in association with a thumbnail image of a corresponding data visualization assigned to the display.

The display configuration setting can comprise a user defined location tag for the display.

The display configuration setting can comprise a user defined display label for the display.

The data visualization can comprise an incident review dashboard configured to graphically illustrate a number of incidents that occurred in time intervals based on an analysis of a plurality of events.

The presented data visualization can be dynamically updated based on search results of a search query as new search results become available for the analytics data.

The method can further comprise generating the data visualization from search results corresponding to a user provided search query, wherein the analytics data corresponds to the search results.

The sending of the data can cause the data visualization to be pushed to the registered display.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method of display management comprising:
   registering a display of a display device based on receiving a request from the display device, the registering including creating a display profile for the display comprising network connection information and a display identifier, the display identifier uniquely identifying the display amongst a plurality of displays of the display device;
   establishing the display connection to the display of the display device using the network connection information and the display identifier from the display profile;
   receiving first user input from the display management device indicating a display configuration setting is for the display and saving the display configuration setting to the display profile;
   receiving second user input from the display management device that represents an assignment of a data visualization of analytics data to the registered display based on the display configuration setting being assigned to the display in the display profile; and
   in response to the receiving of the user input representing the assignment, sending data, over the display connection to the display, that updates the display of the display device to include the data visualization.

2. The method of claim 1, further comprising:
   in response to the receiving of the request, transmitting executable code to the display device, the executable code when executed by the display device causing presentation of a registration code on the display;
   receiving, from the display management device, a user provided registration code; and
   performing the registering of the display based on determining the user provided registration code corresponds to the registration code.

3. The method of claim 1, wherein the display configuration setting assigns the display to a group of registered displays, the assignment is to the group, and in response to the receiving of the user input, the data updates the registered displays of display devices to include the data visualization.

4. The method of claim 1, further comprising:
   determining a geographic location of the display; and
   assigning the display to a group of registered displays based on the determined geographic location, wherein the user input represents the assignment of the data visualization to the group of registered displays.

5. The method of claim 1, wherein the request is from a web browser on the display device, the display is a browser window of the web browser, and the sending of the data causes the data visualization to be presented in the browser window of the web browser.

6. The method of claim 1, wherein the sending of the data causes a presented data visualization to be replaced with the data visualization on the registered display.

7. The method of claim 1 wherein the display is a browser window and the method further comprises in response to the receiving of the request, sending data causing presentation of a web page in the browser window display, wherein the sending of the data causes the data visualization to be presented on the web page in the browser window based on the registering of the display.

8. The method of claim 1, wherein the analytics data corresponds to events, each event comprising a timestamp and a portion of raw machine data.

9. The method of claim 1, wherein the analytics data corresponds to a set of search results of a search query and the method further comprises:
receiving an update to the set of search results;
updating the analytics data based on the received update; and
sending update data causing the data visualization presented on the display to be automatically updated to correspond to the updated analytics data.

10. The method of claim 1, further comprising sending display data that causes presentation of a display management screen on the display management device, the display management screen comprising a list of registered displays including the display, each registered display in the list being presented in association with a visual indicator of a corresponding data visualization assigned to the display.

11. The method of claim 1, further comprising sending display data that causes presentation of a display management screen comprising a list of registered displays including the display, each registered display in the list being presented in association with a thumbnail image of a corresponding data visualization assigned to the display.

12. The method of claim 1, wherein the display configuration setting comprises a user defined location tag for the display.

13. The method of claim 1, wherein the display configuration setting comprises a user defined display label for the display.

14. The method of claim 1, wherein the data visualization comprises an incident review dashboard configured to graphically illustrate a number of incidents that occurred in time intervals based on an analysis of a plurality of events.

15. The method of claim 1, wherein the presented data visualization is dynamically updated based on search results of a search query as new search results become available for the analytics data.

16. The method of claim 1, wherein the registering of the display is on at least one server, the display connection is established over a network between the at least one server and the display device, and the receiving of the second user input is by the at least one server over the network.

17. The method of claim 1, wherein the sending of the data causes the data visualization to be pushed to the registered display.

18. A system comprising:
one or more processors; and
computer memory having instructions stored thereon, the instructions, when executed by the one or more processors causing the system to perform a method comprising:
registering a display of a display device based on receiving a request from the display device, the registering including creating a display profile for the display comprising network connection information and a display identifier, the display identifier uniquely identifying the display amongst a plurality of displays of the display device;
establishing the display connection to the display of the display device using the network connection information and the display identifier from the display profile;
receiving first user input from the display management device indicating a display configuration setting is for the display and saving the display configuration setting to the display profile;
receiving second user input from the display management device that represents an assignment of a data visualization of analytics data to the registered display based on the display configuration setting being assigned to the display in the display profile; and
in response to the receiving of the user input representing the assignment, sending data, over the display connection to the display, that updates the display of the display device to include the data visualization.

19. The system of claim 18, wherein the method further comprises:
in response to the receiving of the request, causing presentation of a registration code on the display;
receiving, from the display management device, a user provided registration code; and
performing the registering of the display based on determining the user provided registration code corresponds to the registration code.

20. The system of claim 18, wherein the display configuration setting assigns the display to a group of registered displays, the assignment of the data visualization is to the group, each of the registered displays is of the display device, and in response to the receiving of the user input, the data causes the data visualization to be presented on each registered display of the group.

21. The system of claim 18, wherein the method further comprises:
determining a geographic location of the display; and
assigning the display to a group of registered displays based on the determined geographic location, wherein the user input indicates the assignment of the data visualization to the group of registered displays.

22. The system of claim 18, wherein the request is from a web browser on the display device and the sending of the data causes the data visualization to be presented in the web browser.

23. The system of claim 18, wherein the sending of the data causes a presented data visualization to be replaced with the data visualization on the registered display.

24. The system of claim 18, wherein the method further comprises in response to the receiving of the request, sending data causing presentation of a web page on the display, wherein the sending of the data causes the data visualization to be presented on the web page based on the registering of the display.

25. One or more non-transitory computer-readable media having instructions stored thereon, the instructions, when executed by a processor of a computing device, to cause the computing device to perform a method comprising:
registering a display of a display device based on receiving a request from the display device, the registering including creating a display profile for the display comprising network connection information and a display identifier, the display identifier uniquely identifying the display amongst a plurality of displays of the display device;
establishing the display connection to the display of the display device using the network connection information and the display identifier from the display profile;
receiving first user input from the display management device indicating a display configuration setting is for the display and saving the display configuration setting to the display profile;

receiving second user input from the display management device that represents an assignment of a data visualization of analytics data to the registered display based on the display configuration setting being assigned to the display in the display profile; and in response to the receiving of the user input representing the assignment, sending data, over the display connection to the display, that updates the display of the display device to include the data visualization.

26. The one or more computer-readable media of claim 25, wherein the method further comprises:

in response to the receiving of the request, causing presentation of a registration code on the display;

receiving, from the display management device, a user provided registration code; and performing the registering of the display based on determining the user provided registration code corresponds to the registration code.

27. The one or more computer-readable media of claim 25, wherein the display configuration setting assigns the display to a group of registered displays, the assignment of the data visualization is to the group, and in response to the receiving of the user input, the data causes the data visualization to be presented on each registered display of the group.

28. The one or more computer-readable media of claim 25, wherein the method further comprises:

determining a geographic location of the display; and assigning the display to a group of registered displays based on the determined geographic location, wherein the user input indicates the assignment of the data visualization to the group of registered displays.

29. The one or more computer-readable media of claim 25, wherein the request is from a web browser on the display device and the sending of the data causes the data visualization to be presented in the web browser.

30. The one or more computer-readable media of claim 25, wherein the sending of the data causes a presented data visualization to be replaced with the data visualization on the registered display.

* * * * *